(12) United States Patent
Nomura et al.

(10) Patent No.: US 8,553,879 B2
(45) Date of Patent: Oct. 8, 2013

(54) CONTENT TRANSMISSION DEVICE AND CONTENT TRANSMISSION METHOD

(75) Inventors: Kazuhiro Nomura, Osaka (JP); Katsuhisa Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 287 days.

(21) Appl. No.: 12/997,954

(22) PCT Filed: May 10, 2010

(86) PCT No.: PCT/JP2010/003172
§ 371 (c)(1),
(2), (4) Date: Dec. 14, 2010

(87) PCT Pub. No.: WO2010/131454
PCT Pub. Date: Nov. 18, 2010

(65) Prior Publication Data
US 2011/0107083 A1 May 5, 2011

(30) Foreign Application Priority Data
May 11, 2009 (JP) ................................. 2009-114289

(51) Int. Cl.
*H04L 29/06* (2006.01)
(52) U.S. Cl.
USPC ........................................... 380/35; 380/277
(58) Field of Classification Search
USPC .................................................. 380/277, 35
See application file for complete search history.

(56) References Cited

U.S. PATENT DOCUMENTS

2002/0002468 A1* 1/2002 Spagna et al. .................... 705/1
2006/0112272 A1 5/2006 Morioka et al.
2006/0279628 A1* 12/2006 Fleming ........................ 348/143

(Continued)

FOREIGN PATENT DOCUMENTS

JP 2004-194295 7/2004

(Continued)

OTHER PUBLICATIONS

Bux et al. "Technologies and building blocks for fast packet forwarding," Jan. 2001, Communications Magazine, IEEE (vol. 39, Issue: 1), pp. 70-77.*

(Continued)

*Primary Examiner* — Kambiz Zand
*Assistant Examiner* — Michael Guirguis
(74) *Attorney, Agent, or Firm* — Wenderoth, Lind & Ponack, L.L.P.

(57) ABSTRACT

Provided is a content transmission device 310 that can reduce failure of content key confirmation processing during special playback such as fast-forwarding and fast-rewinding. A key management unit 312 generates or updates a key parameter, and stores therein the generated or updated key parameter. The key management unit 312 receives a key parameter from the content reception device 340, and calculates a difference between the key parameter stored therein and the received key parameter. By using the calculated difference, a transmission control unit 313 judges whether or not to change a transmission speed at which an encrypted content portion is to be transmitted, and depending on a result of the judgment, selects one of transmission speeds and transmits the encrypted content portion in accordance with the selected transmission speed. When the difference is greater than a first threshold value, the transmission control unit 313 selects one of the transmission speeds that is slower than a current transmission speed.

3 Claims, 11 Drawing Sheets

(56) References Cited

U.S. PATENT DOCUMENTS

| | | |
|---|---|---|
| 2009/0100147 A1 | 4/2009 | Igarashi |
| 2009/0180484 A1 | 7/2009 | Igarashi |
| 2009/0193469 A1 | 7/2009 | Igarashi |
| 2009/0222514 A1 | 9/2009 | Igarashi |
| 2009/0235317 A1 | 9/2009 | Igarashi |
| 2009/0307307 A1 | 12/2009 | Igarashi |
| 2009/0316891 A1 | 12/2009 | Suzuki et al. |

FOREIGN PATENT DOCUMENTS

| | | |
|---|---|---|
| JP | 2004-260522 | 9/2004 |
| JP | 2005-341219 | 12/2005 |
| JP | 2007-67929 | 3/2007 |
| JP | 2008-234722 | 10/2008 |
| JP | 2009-71641 | 4/2009 |
| JP | 2010-4191 | 1/2010 |
| WO | 2007/102547 | 9/2007 |

OTHER PUBLICATIONS

International Search Report issued Jun. 8, 2010 in International (PCT) Application No. PCT/JP2010/003172.

* cited by examiner

FIG. 4

Speed correspondence table

| Speed level | Bit rate |
|---|---|
| 1 | 32 Mbps |
| 2 | 20 Mbps |
| 3 | 16 Mbps |
| 4 | 10 Mbps |
| 5 | 1 Mbps |

CONTENT TRANSMISSION DEVICE AND CONTENT TRANSMISSION METHOD

TECHNICAL FIELD

The present invention relates to content transmission technology for transmitting encrypted content, and in particular to transmission control technology for controlling transmission of content in accordance with a result of content key confirmation.

BACKGROUND ART

In recent years, content distribution services have been provided. In the content distribution services, content playback devices make requests for contents, and in response, content transmission devices distribute the requested contents to the content playback devices. In such distribution services, contents are encrypted to protect their copyrights, and the encrypted contents are transmitted via a wired LAN conforming to IEEE 802.3, a wireless LAN conforming to IEEE 802.11, and the like.

When transmitting/receiving contents in the above manner, a DTCP (Digital Transmission Content Protection) is utilized as one technique to protect copyrights of the contents.

DTCP is technology for protecting contents on transmission media such as those specified in IEEE 1394 and a USB (Universal Serial Bus). DTCP is also a method standardized by the DTLA (Digital Transmission Licensing Administrator), LLC. Each device holds a device certificate issued by the DTLA, LLC. Upon transmission of content, a receiving device and a transmitting device authenticate each other's device certificates and perform key exchange. This process for authentication and key exchange is referred to as AKE (Authentication and Key Exchange). This way, multiple devices can share an encryption key, and thus perform a network transmission while protecting the contents.

DTCP has been expanded so it can be used on the IP (Internet Protocol) network. The expanded DTCP is referred to as DTCP-IP.

When performing normal playback according to DTCP-IP, a sink device (i.e., a content requesting side) outputs a single content acquisition request, which indicates acquisition of one content in its entirety, to a source device (i.e., a content transmitting side). The source device divides the entire content that has been requested into a plurality of content portions, then encrypts and transmits each of the content portions. The size of each content portion is 128 MB. For each content portion, the source device updates a nonce Nc, which is a parameter used when generating a content key, by adding "1" to the nonce Nc. As a result, a content key is generated for each content portion by using the updated nonce Nc, and each content portion is encrypted using the generated content key. That is to say, a content key that is used to encrypt one content portion is different from any of content keys that are used to encrypt other content portions. With this technique, even if a content key used to encrypt one content portion is leaked, this leak does not progress to leak of content keys for other content portions. Consequently, the security of other content portions can be preserved.

According to DTCP-IP, in order to confirm a content key, the source device checks a nonce NcT that has been received from the sink device in connection with the current nonce Nc of the source device. The current nonce Nc of the source device is considered normal if it falls within a range of NcT to NcT+5 inclusive.

Generally, a device that plays pack contents has a normal playback function for performing playback at a normal speed, as well as a special playback function for performing special playback such as fast-forwarding and fast-rewinding. When performing special playback such as fast-forwarding and fast-rewinding in accordance with DTCP-IP, the sink device outputs to the source device a plurality of content acquisition requests in succession within a short period of time. The content acquisition requests are requests for acquisition of respective portions of content. As a result of the plurality of content acquisition requests having been output in succession within a short period of time, the source device transmits portions of the content requested by the respective content acquisition requests to the sink device. In this manner, fast-forwarding and fast-rewinding can be achieved.

In this case, the source device updates a nonce Nc each time it receives a single content acquisition request, as with the case where content is requested in its entirety. As a result, during the special playback, the nonce Nc is frequently updated in the source device within a short period of time. This may lead to a situation where the nonce Nc does not fall within a normal range and therefore content key confirmation processing fails. In such a situation, decryption must be halted.

In order to solve the above problem, Patent Literature 1 discloses technology for, when performing special playback, reducing the frequency of content requests that cause updates of a content key, or bringing a halt to the next content request, until the content key confirmation processing completes.

CITATION LIST

Patent Literature

[Patent Literature 1] JP Patent Application Publication No. 2007-67929

SUMMARY OF INVENTION

Technical Problem

According to Patent Literature 1, when performing special playback, the frequency of content requests that cause updates of a content key is reduced, or the next content request is brought to a halt, until the content key confirmation processing completes. This gives rise to the problem that delay occurs in receiving the content, and therefore the content cannot be displayed properly. For example, when playing back video content while simultaneously receiving the video content, there is a possibility that the video currently being played back is interrupted or the like every time the content key confirmation processing is performed.

In order to solve the above problem, the present invention aims to provide a content transmission device, an integrated circuit and a content transmission method that enable special playback of content without causing interruptions in the video currently being played back.

Solution to Problem

In order to solve the above problem, one aspect of the present invention is a content transmission device that encrypts and transmits each of portions that constitute content to a content reception device, the content transmission device comprising: a transmission control unit operable to receive a request for transmitting a portion of the content from the content reception device, and to transmit to the content reception device (i) an encrypted portion, which is generated in response to the request, and (ii) a first key parameter, based on which a content key is generated, the content key being used for encrypting the portion; a key management unit operable to (i) upon receiving the request, generate the first key parameter when the first key parameter has not yet been generated, and update the first key parameter when the first key parameter has already been generated, and (ii) store therein the generated or updated first key parameter; and an encryption unit operable to generate the content key based on the first key parameter, and to encrypt the portion corresponding to the request by using the generated content key so as to generate the encrypted portion, wherein the key management unit receives a second key parameter from the content reception device, and calculates a difference between the first key parameter and the received second key parameter, and the transmission control unit judges, by using the difference, whether or not to change a transmission speed at which the encrypted portion is to be transmitted, selects one of transmission speeds based on a result of the judgment, and transmits the encrypted portion at the selected transmission speed.

Advantageous Effects of Invention

The above content transmission device, which is one aspect of the present invention, can perform proper operational control in accordance with the current status, and reduce the failure of content key confirmation processing during special playback.

BRIEF DESCRIPTION OF DRAWINGS

FIG. 4 shows one example of a speed correspondence table 400 indicating a correspondence relationship between a speed level and a bit rate.

FIG. 8 continues to FIG. 9.

FIG. 9 continues from FIG. 8.

DESCRIPTION OF EMBODIMENTS

Figure 1:
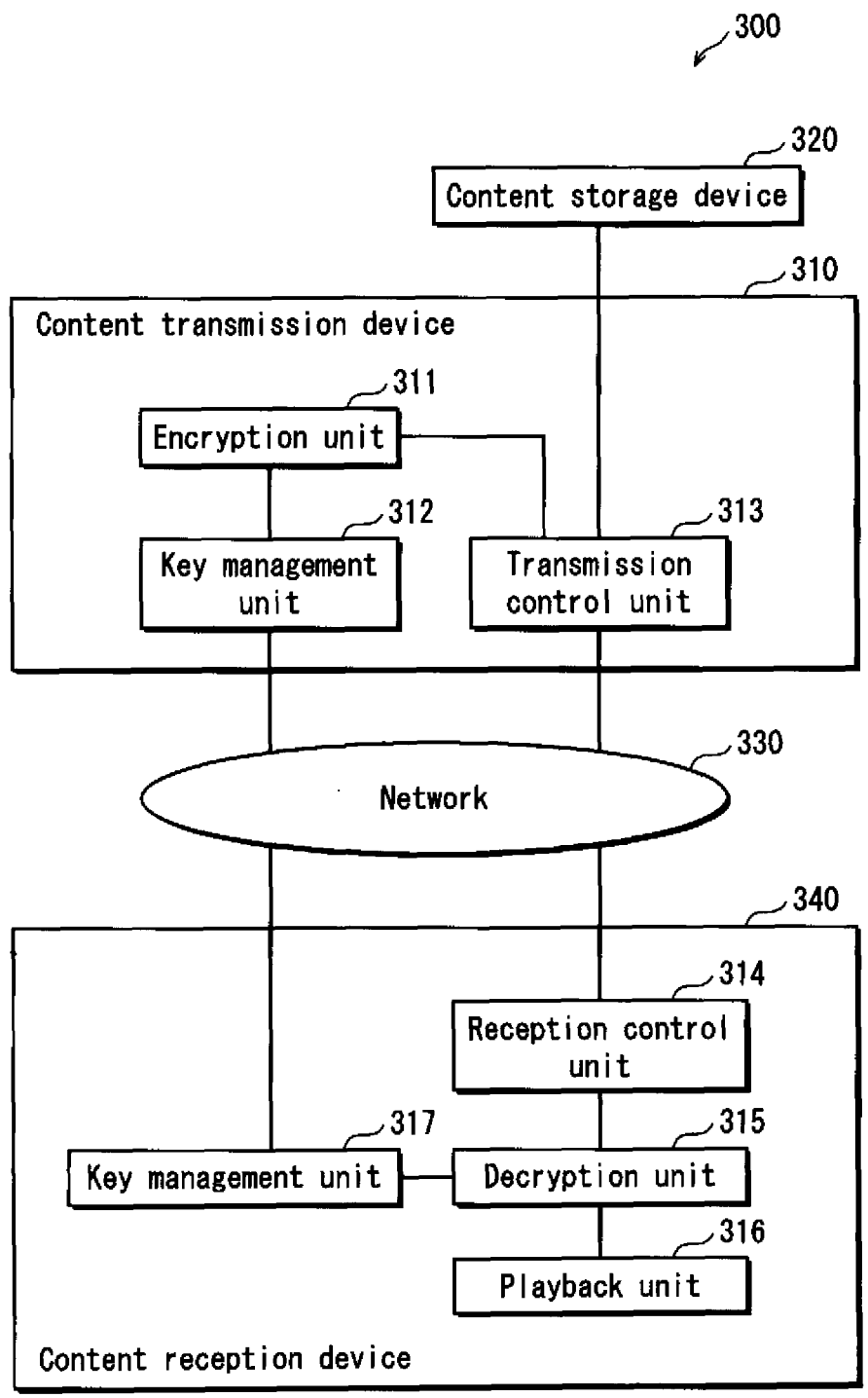
FIG. 1 is a block diagram showing the structure of a content transmission/reception system 300.

An aspect of the present invention is a content transmission device that encrypts and transmits each of portions that constitute content to a content reception device, the content transmission device comprising: a transmission control unit operable to receive a request for transmitting a portion of the content from the content reception device, and to transmit to the content reception device (i) an encrypted portion, which is generated in response to the request, and (ii) a first key parameter, based on which a content key is generated, the content key being used for encrypting the portion; a key management unit operable to (i) upon receiving the request, generate the first key parameter when the first key parameter has not yet been generated, and update the first key parameter when the first key parameter has already been generated, and (ii) store therein the generated or updated first key parameter; and an encryption unit operable to generate the content key based on the first key parameter, and to encrypt the portion corresponding to the request by using the generated content key so as to generate the encrypted portion, wherein the key management unit receives a second key parameter from the content reception device, and calculates a difference between the first key parameter and the received second key parameter, and the transmission control unit judges, by using the difference, whether or not to change a transmission speed at which the encrypted portion is to be transmitted, selects one of transmission speeds based on a result of the judgment, and transmits the encrypted portion at the selected transmission speed.

Here, when the difference is greater than a first threshold value, the transmission control unit may select one of the transmission speeds that is slower than a current transmission speed.

Also, when the difference is smaller than or equal to a second threshold, the transmission control unit may select one of the transmission speeds that is faster than the current transmission speed. The second threshold value may be smaller than the first threshold value.

Also, another aspect of the present invention is an integrated circuit provided in a content transmission device that encrypts and transmits each of portions that constitute content to a content reception device, the integrated circuit comprising: a transmission control unit operable to receive a request for transmitting a portion of the content from the content reception device, and to transmit to the content reception device (i) an encrypted portion, which is generated in response to the request, and (ii) a first key parameter, based on which a content key is generated, the content key being used for encrypting the portion; a key management unit operable to (i) upon receiving the request, generate the first key parameter when the first key parameter has not yet been generated, and update the first key parameter when the first key parameter has already been generated, and (ii) store therein the generated or updated first key parameter; and an encryption unit operable to generate the content key based on the first key parameter, and to encrypt the portion corresponding to the request by using the generated content key so as to generate the encrypted portion, wherein the key management unit receives a second key parameter from the content reception device, and calculates a difference between the first key parameter and the received second key parameter, and the transmission control unit judges, by using the difference, whether or not to change a transmission speed at which the encrypted portion is to be transmitted, selects one of transmission speeds based on a result of the judgment, and transmits the encrypted portion at the selected transmission speed.

Also, another aspect of the present invention is a content transmission method used by a content transmission device that encrypts and transmits each of portions that constitute content to a content reception device, the content transmission method comprising the steps of: (a) receiving a request for transmitting a portion of the content from the content reception device, and transmitting to the content reception device (i) an encrypted portion, which is generated in response to the request, and (ii) a first key parameter, based on which a content key is generated, the content key being used for encrypting the portion; (b) upon receiving the request, generating the first key parameter when the first key parameter has not yet been generated, and updating the first key parameter when the first key parameter has already been generated, and storing therein the generated or updated first key parameter; and (c) generating the content key based on the first key parameter, and encrypting the portion corresponding to the request by using the generated content key so as to generate the encrypted portion. In step (b), a second key parameter is received from the content reception device, and a difference between the first key parameter and the received second key parameter is calculated. In step (a), whether or not to change a transmission speed at which the encrypted portion is to be transmitted is judged by using the difference, one of transmission speeds is selected based on a result of the judgment, and the encrypted portion is transmitted at the selected transmission speed.

1. Embodiment 1

With reference to the drawings, the following describes a content transmission/reception system 300, which is one embodiment of the present invention.

As shown in FIG. 1, the content transmission/reception system 300 is composed of a content transmission device 310, a content storage device 320, and a content reception device 340. The content transmission device 310 and the content reception device 340 are connected to each other via a network 330. The content storage device 320 is connected to the content transmission device 310. The content storage device 320 stores content therein.

(1) Content Transmission Device 310

The content transmission device 310 encrypts and transmits each of portions that constitute content to the content reception device 340 (a portion of the content may be referred to as a "content portion" herein). As shown in FIG. 1, the content transmission device 310 includes an encryption unit 311, a key management unit 312, and a transmission control unit 313.

The transmission control unit 313 receives a request for transmitting a portion of the content from the content reception device 340. Then, the transmission control unit 313 transmits, to the content reception device 340, (i) an encrypted portion, which is generated in response to the request, and (ii) a first key parameter, based on which a content key is generated, the content key being used for encrypting the portion.

The key management unit 312, upon receiving the request, generates the first key parameter when it has not yet been generated, and updates the first key parameter when it has already been generated. The key management unit 312 then stores therein the generated or updated first key parameter.

The encryption unit 311 generates the content key based on the first key parameter, and encrypts the portion corresponding to the request with the use of the generated content key so as to generate the encrypted portion.

The key management unit 312 receives a second key parameter from the content reception device 340, and calculates a difference between the first key parameter stored therein and the second key parameter received from the content reception device 340.

By using the calculated difference, the transmission control unit 313 judges whether or not to change a transmission speed at which the encrypted portion is to be transmitted. Based on a result of the judgment, the transmission control unit 313 selects one of transmission speeds, and transmits the encrypted portion at the selected transmission speed.

(2) Content Reception Device 340 and Display Device 350

The content reception device 340 includes a reception control unit 314, a decryption unit 315, a playback unit 316, and a key management unit 317.

The reception control unit 314 transmits the request for the portion of the content to the content transmission device 310. The reception control unit 314 also receives the encrypted portion, which has been generated in response to the request, and the first key parameter, based on which the content key is generated, the content key being used for encrypting the portion.

When the key management unit 317 has received the first key parameter, it stores therein the received first key parameter as the second key parameter.

The decryption unit 315 (i) generates the content key based on the received first key parameter, (ii) decrypts the received encrypted portion with the use of the generated content key, thereby generating the portion, and (iii) outputs the generated portion to the playback unit 316.

The playback unit 316 (i) receives the portion, (ii) expands the received portion, thereby generating digital image data and digital audio data, and (iii) outputs an image and audio based on the generated digital image data and digital audio data.

The key management unit 317 transmits the second key parameter stored therein and a content key confirmation request to the content transmission device 310. The key management unit 317 also receives a content key confirmation response from the content transmission device 310.

(3) Other Notes

When the aforementioned difference is greater than a first threshold value, the transmission control unit 313 may select one of the transmission speeds that is slower than a current transmission speed.

When the aforementioned difference is smaller than or equal to a second threshold value, the transmission control unit 313 may select one of the transmission speeds that is faster than the current transmission speed. Here, the second threshold value is smaller than the first threshold value.

The encryption unit 311, the key management unit 312 and the transmission control unit 313 included in the content transmission device 310 constitute a single integrated circuit.

2. Embodiment 2

With reference to the drawings, the following describes a content transmission/reception system 10, which is another embodiment of the present invention.

2.1 Content Transmission/Reception System 10

Figure 2:
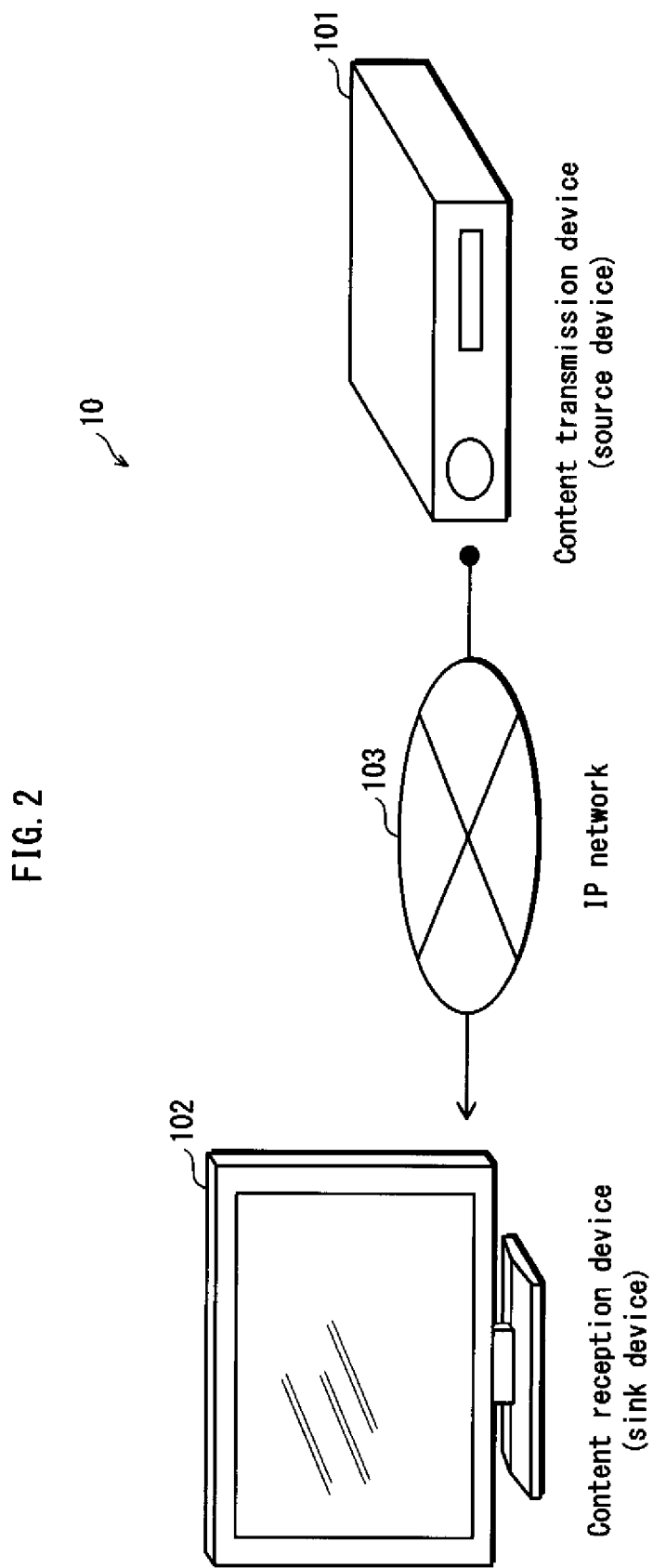
FIG. 2 schematically shows an example of the structure of a content transmission/reception system 10.

As shown in FIG. 2, the content transmission/reception system 10 is composed of a content transmission device 101 and a content reception device 102. The content transmission device 101 and the content reception device 102 are connected to each other via an IP network 103, and communicate with each other using TCP/IP protocols.

Specific examples of the content transmission device 101 include an audiovisual device such as an HDD recorder (a hard disk recorder) and an information terminal such as a PC (personal computer). Specific examples of the content reception device 102 include an audiovisual device with a playback function, such as a DTV (digital television), a BD player (Blu-ray Disc player) and a DVD player, and an information terminal such as a PC.

In the content transmission/reception system 10, the content transmission device 101 stores content therein. In response to a request from the content reception device 102, the content transmission device 101 transmits the content or a content portion to the content reception device 102 via the IP network 103. The content reception device 102 receives the content or the content portion from the content transmission device 101 via the IP network 103, and plays back the received content or content portion.

Here, the content transmission device 101 and the content reception device 102 both support the DLNA (Digital Living Network Alliance) standards, and use the DTCP-IP standards for transmission of content.

In a case where content is transmitted in conformity with the DTCP-IP standards, the content transmission device 101 serves as a source device that receives a request for the content and transmits the content, whereas the content reception device 102 serves as a sink device that requests for the content, receives the content, and plays back or records the content.

The content is composed of content data constituted from, for example, video, still images, and music. The content data is generated by, for example, compressing and encoding digital data such as images, audio, and a combination of images and audio, with high efficiency.

With reference to FIG. 2, the following explains an overview of processing that is performed when a user views the content stored in the content transmission device 101. The user operates the content reception device 102 to view the content.

When the user intends to view the content, the user operates the content reception device 102 and as a result, the content reception device 102 transmits a content acquisition request, which is an instruction for acquiring the content demanded by the user, to the content transmission device 101. The content transmission device 101 reads out content data corresponding to a portion of the content requested by the received content acquisition request, encrypts the read content data so as to generate encrypted content data, and transmits the generated encrypted content data to the content reception device 102. The content reception device 102 decrypts the received encrypted content data, and plays back the decrypted content data to present it to the user.

Here, it is assumed that the HTTP (hyper text transfer protocol) is used in transmitting a content acquisition request. Note that the content acquisition request may specify an entirety of content data or a portion of the content data (also referred to as a "content portion data"). When the content acquisition request specifies a portion of the content data, it also specifies an acquisition range indicating that portion of the content data. The acquisition range specifically indicates a start position and an end position, within the entirety of the content data, of that portion of the content data. Each of the start position and the end position is time information showing time on a playback time axis starting from the beginning of the content data. Each of the start position and the end position may be byte position information indicated by a corresponding byte measured from the beginning of the content data.

Hereafter, a content acquisition request specifying a portion of content data is referred to as a content portion acquisition request.

When performing normal playback of an entirety of content data from the beginning, the content reception device 102 transmits a content acquisition request that does not contain range information to the content transmission device 101. When performing special playback such as skipping and fast-forwarding, the content reception device 102 transmits a content portion acquisition request to which range information has been appended to the content transmission device 101.

The content transmission device 101 transmits target content data in accordance with the content acquisition request or the content portion acquisition request received from the content reception device 102. Before transmitting this content data, the content transmission device 101 performs control for changing the transmission speed at which the content data is to be transmitted, depending on the status of content key confirmation processing performed between the content transmission device 101 and the content reception device 102.

2.2 Content Transmission Device 101

Figure 3:
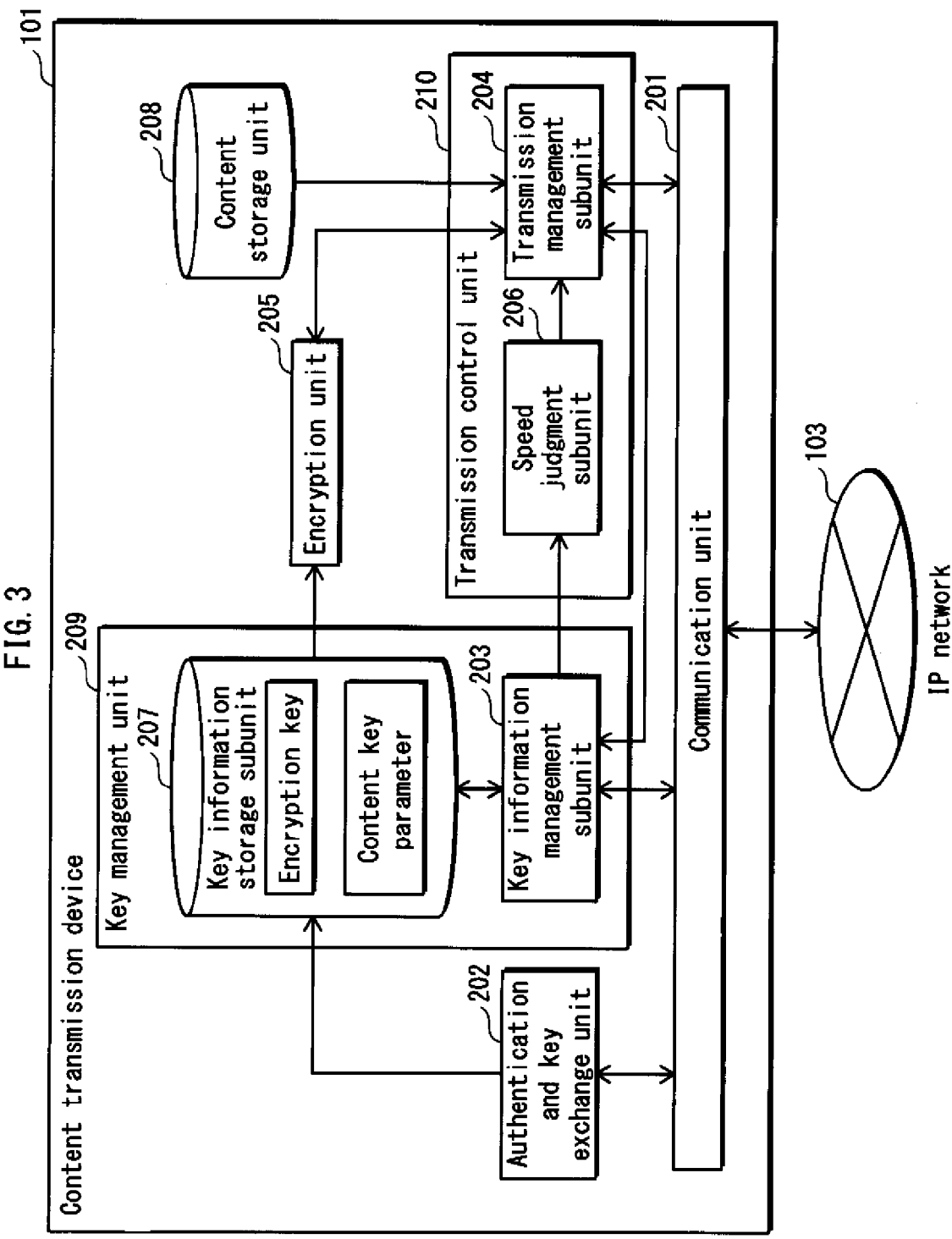
FIG. 3 is a block diagram showing the structure of a content transmission device 101.

As shown in FIG. 3, the content transmission device 101 includes a communication unit 201, an authentication and key exchange unit 202, an encryption unit 205, a content storage unit 208, a key management unit 209, and a transmission control unit 210. The key management unit 209 includes a key information management subunit 203 and a key information storage subunit 207. The transmission control unit 210 includes a transmission management subunit 204 and a speed judgment subunit 206. Here, a part of the communication unit 201, the authentication and key exchange unit 202, the encryption unit 205, the key management unit 209, and the transmission control unit 210 constitute a single integrated circuit.

(1) Communication Unit 201

The communication unit 201 performs control for communication involving transmission of content to the content reception device 102.

The communication unit 201 receives the following requests from the content reception device 102 via the IP network 103: a content acquisition request; a content portion acquisition request; a content key confirmation request; and an authentication and key exchange request. The specifics of the content acquisition request and the content portion acquisition request have been provided earlier. The content key confirmation request is an instruction that requests conformation of the content key. The authentication and key exchange request is an instruction that requests the content transmission device 101 to perform authentication and key exchange with the content reception device 102.

When the communication unit 201 has received the content acquisition request or the content portion acquisition request, it outputs the received content acquisition request or content portion acquisition request to the transmission management subunit 204. Also, when the communication unit 201 has received the content key confirmation request, it outputs the received content key confirmation request to the key information management subunit 203. Furthermore, when the communication unit 201 has received the authentication and key exchange request, it outputs the received authentication and key exchange request to the authentication and key exchange unit 202.

In response to the content acquisition request or the content portion acquisition request, the communication unit 201 receives encrypted content portion data from the transmission management subunit 204, and transmits the received encrypted content portion data to the content reception device 102 via the IP network 103.

(2) Authentication and Key Exchange Unit 202

The authentication and key exchange unit 202 receives the authentication and key exchange request from the content reception device 102 via the communication unit 201. When the authentication and key exchange unit 202 has received the authentication and key exchange request, it performs authentication and key exchange processing with the content reception device 102 in accordance with the DTCP-IP standards. A detailed description of the authentication and key exchange processing is omitted as it is specified in the DTCP-IP standards.

When the mutual device authentication between the content transmission device 101 and the content reception device 102 has succeeded, the authentication and key exchange unit 202 transmits an encryption key to the content reception device 102 via the communication unit 201. The authentication and key exchange unit 202 also writes this encryption key into the key information storage subunit 207.

With the use of the encryption key exchanged through the above authentication and key exchange processing, the content transmission device 101 can encrypt and transmit the content while protecting the copyright of the content.

(3) Transmission Management Subunit 204

The transmission management subunit 204 receives the content acquisition request and the content portion acquisition request from the content reception device 102 via the communication unit 201.

When the transmission management subunit 204 has received the content acquisition request or the content portion acquisition request, it requests the key information management subunit 203 to provide a content key parameter (which may be simply referred to as a key parameter). This content key parameter is the equivalent of the above-mentioned nonce Nc.

As a result of making the request for the content key parameter, the transmission management subunit 204 receives the content key parameter from the key information management subunit 203. When the transmission management subunit 204 has received the content key parameter, it reads out content portion data, which is a portion of content data to be transmitted, from the content storage unit 208, and outputs the read content portion data to the encryption unit 205. The transmission management subunit 204 outputs the content key parameter to the encryption unit 205 as well. The transmission management subunit 204 also requests the encryption unit 205 to encrypt the content portion data.

The transmission management subunit 204 also receives encrypted content portion data from the encryption unit 205. When the transmission management subunit 204 has received the encrypted content portion data, it transmits the received encrypted content portion data and content key parameter to the content reception device 102 via the communication unit 201 and the IP network 103.

Furthermore, the transmission management subunit 204 stores therein a speed level at which data is to be transmitted to the content reception device 102. The transmission management subunit 204 transmits the encrypted content portion data to the content reception device 102 at the speed level stored therein.

Here, the speed level is defined as one of the following five levels: "1", "2", "3", "4", and "5". Level "1" is a transmission level with the fastest transmission speed, and level "5" is a transmission level with the slowest transmission speed. The default value for the speed level is "3". FIG. 4 shows a speed correspondence table 400. As shown in the speed correspondence table 400, when the speed level is "1", "2", "3", "4", and "5", the bit rate used for the transmission is "32" Mbps, "20" Mbps, "16" Mbps, "10" Mbps, and "1" Mbps, respectively. At each of the speed levels, the transmission management subunit 204 performs the transmission using a corresponding one of the bit rates shown in the speed correspondence table 400.

The transmission management subunit 204 receives an instruction for changing the speed level from the speed judgment subunit 206. According to this instruction, the transmission management subunit 204 switches from one speed level to another. To be more specific, the transmission management subunit 204 stores therein one of the values "1", "2", "3", "4", and "5" as a speed level instructed from the speed judgment subunit 206. Upon instruction from the speed judgment subunit 206, the transmission management subunit 204 selects one of the speed levels "1", "2", "3", "4", and "5" and uses the bit rate corresponding to the selected speed level.

As one example, in order to perform the transmission at a bit rate corresponding to the selected speed level, the transmission management subunit 204 lengthens or shortens an interval at which packets are transmitted, where a packet is a unit of transmission of an encrypted content portion data. As another example, the transmission management subunit 204 reduces or increases the size of an encrypted content portion data contained in one packet. As yet another example, the transmission management subunit 204 changes the image quality of the content data to high image quality, middle image quality, or low image quality. It is permissible to combine any of the above examples. In this manner the transmission management subunit 204 changes the speed of transmission of the encrypted content portion data.

(4) Key Information Management Subunit 203

The key information management subunit 203 performs processing relating to the content key parameter as follows.

The key information management subunit 203 receives the request to provide the content key parameter from the transmission management subunit 204. When the key information management subunit 203 has received the request to provide the content key parameter, it generates or updates the content key parameter.

To be more specific, one of the following operations (a) and (b) is performed. (a) When the authentication and key exchange have succeeded between the content transmission device 101 and the content reception device 102, a TCP session is established between these devices Immediately after the establishment of the TCP session, the key information management subunit 203 generates a random number and generates the content key parameter using the generated random number. Put another way, when the content key parameter has not yet been generated, the key information management subunit 203 generates the content key parameter. For example, assume that the generated random number is the content key parameter. The key information management subunit 203 writes the generated content key parameter into the key information storage subunit 207.

(b) In a single TCP session, the key information management subunit 203 updates the content key parameter each time 128 MB of content data is transmitted. Put another way, when the content key parameter has already been generated, the key information management subunit 203 updates the content key parameter. For example, the key information management subunit 203 adds a value "1" to the content key parameter using a modulus "2^64".

Content key parameter=Content key parameter+1 mod 2^64

Here, 2^64 denotes two raised to the power of 64.

Next, the key information management subunit 203 writes the updated content key parameter into the key information storage subunit 207.

The reason why the content key parameter is updated in the above manner is because when the size of the content is large, if the same content key is continuously used for the entire content, then the content key will be at high risk of being subjected to code-breaking.

Next, the key information management subunit 203 outputs the generated or updated content key parameter to the transmission management subunit 204.

The key information management subunit 203 also receives a content key parameter and a content key confirmation request from the content reception device 102 via the communication unit 201. When the key information management subunit 203 has received the content key parameter and the content key confirmation request, it performs the content key confirmation processing in accordance with the DTCP-IP standards as follows. Here, the content key parameter received from the content reception device 102 via the communication unit 201 is denoted as a content key parameter B.

The key information management subunit 203 reads out the content key parameter stored in the key information storage subunit 207. Here, the read content key parameter is denoted as a content key parameter A. Next, the key information management subunit 203 calculates a difference between the content key parameters A and B (the difference=the content key parameter A−the content key parameter B), and judges whether or not the calculated difference falls within a specified range. By way of example, the key information management subunit 203 judges whether the difference is greater than or equal to "0" and is smaller than or equal to "5".

If the difference falls within the specified range (by way of example, if the difference is greater than or equal to "0" and is smaller than or equal to "5"), then the key information management subunit 203 judges that the content key parameter B is valid, and notifies a content key confirmation response indicating that the confirmation has resulted in a "Success" to the content reception device 102 via the communication unit 201.

If the difference does not fall within the specified range (by way of example, if the difference is smaller than "0" or is greater than or equal to "6"), then it means the content key parameter B may be invalid data. In this case, the key information management subunit 203 notifies a content key confirmation response indicating that the confirmation has resulted in a "Failure" to the content reception device 102 via the communication unit 201.

The key information management subunit 203 also notifies the calculated difference to the speed judgment subunit 206.

(5) Encryption Unit 205

The encryption unit 205 receives a request to perform encryption, the content portion data, and the content key parameter from the transmission management subunit 204. When the encryption unit 205 has received the request to perform encryption, the content portion data and the content key parameter, it reads out the encryption key from the key information storage subunit 207, and generates the content key based on the read encryption key and the received content key parameter as shown below by way of example.

Content key=AES(encryption key+constant+content key parameter)

Here, AES (X+Y+Z) indicates that an AES (Advanced Encryption Standard) is performed on X+Y+Z (a value obtained by adding X, Y and Z). When performing the encryption according to the AES, a predetermined secret key is used. The constant is a predetermined value.

Note that the content key may be generated in accordance with the equation "content key=AES (encryption key xor constant xor content key parameter)", instead of the equation "content key=AES (encryption key+constant+content key parameter). Here, xor denotes an exclusive or.

Also, instead of the AES, other secret key cryptosystem (also referred to as a symmetric key cryptosystem, a shared key encryptosystem, a common key encryptosystem, etc.) may be used. Some examples of such a secret key cryptosystem are Triple DES (Data Encryption Standard), FEAL (Fast data Encipherment Algorithm), MISTY, and IDEA (International Data Encryption Algorithm).

Note that the method for generating the content key is not limited to the above-described methods. It is permissible to use a content key generation method specified in the DTCP standards.

Next, the encryption unit 205 encrypts the content portion data received from the transmission management subunit 204 by using the generated content key, thereby generating the encrypted content portion data. Here, the encryption unit 205 performs the encryption by using the AES. The encryption unit 205 may perform the encryption by using other secret key cryptosystem such as the ones described above. Next, the generated encrypted content portion data is output to the transmission management subunit 204.

Although it has been described above that the encryption unit 205 receives the content key parameter from the transmission management subunit 204 and uses the encryption key stored in the key information storage subunit 207, the present embodiment is not limited this way. For example, the encryption unit 205 may read out both of the content key parameter and the encryption key from the key information storage subunit 207, or may receive both of the content key parameter and the encryption key from the transmission management subunit 204.

(6) Speed Judgment Subunit 206

The speed judgment subunit 206 receives the difference between the content key parameters A and B from the key information management subunit 203. When the speed judgment subunit 206 has received the difference, it makes a judgment on the speed level, and depending on the result of the judgment on the speed level, instructs the transmission management subunit 204 to change the speed level.

The speed judgment subunit 206 receives, from the key information management subunit 203, (i) a content key confirmation response (ACCEPTED) indicating that the content key confirmation has succeeded, i.e., the content key is valid, and (ii) a content key confirmation response (REJECTED) indicating that content key confirmation has failed, i.e., the content key is invalid.

(a) In a case where content key confirmation response (ACCEPTED) has been received When the speed judgment subunit 206 has received the content key confirmation response (ACCEPTED), it judges whether the received difference is smaller than or equal to a slowdown threshold value (also referred to as a first threshold value). One example of the slowdown threshold value is "4".

(a1) When judging that the difference is not smaller than or equal to the slowdown threshold value, the speed judgment subunit 206 further judges whether the current speed level is the slowest speed level. Here, there are five speed levels, and the speed level "5" denotes the slowest speed.

(a11) If the current speed level is not the slowest speed level, the speed judgment subunit 206 instructs the transmission management subunit 204 to switch to a slower speed level. For example, if the current speed level is "3", the speed judgment subunit 206 instructs the transmission management subunit 204 to switch to the speed level "4".

(a12) If the current speed level is the slowest speed level, the speed judgment subunit 206 does not instruct the transmission management subunit 204 to change the speed level.

As described above, even when the content key confirmation is valid, if the difference is greater than or equal to a predetermined value, it is possible to reduce the frequency at which the content key parameter is updated by slowing down the transmission speed.

(a2) When judging that the difference is smaller than or equal to the slowdown threshold value, the speed judgment subunit 206 further judges whether the received difference is smaller than or equal to a speed-up threshold value (also referred to as a second threshold value). One example of the speed-up threshold value is "1". Here, the speed-up threshold value (second threshold value) is smaller than the slowdown threshold value (first threshold value).

(a21) When judging that the difference is smaller than or equal to the speed-up threshold value, the speed judgment subunit 206 further judges whether the current speed level is the fastest speed level. Here, the speed level "1" denotes the fastest speed. If the current speed level is not the fastest speed level, the speed judgment subunit 206 instructs the transmission management subunit 204 to switch to a faster speed level. For example, if the current speed level is "3", the speed judgment subunit 206 instructs the transmission management subunit 204 to switch to the speed level "2".

(a22) When judging that the difference is not smaller than or equal to the speed-up threshold value, or when the current speed level is the fastest speed level, the speed judgment subunit 206 does not instruct the transmission management subunit 204 to change the speed level.

(b) In a case where content key confirmation response (REJECTED) has been received When the speed judgment subunit 206 has received the content key confirmation response (REJECTED), it judges whether the current speed level is the slowest speed level. Here, the speed level "5" denotes the slowest speed.

(b1) If the current speed level is not the slowest speed level, the speed judgment subunit 206 instructs the transmission management subunit 204 to switch to a slower speed level. For example, if the current speed level is "3", the speed judgment subunit 206 instructs the transmission management subunit 204 to switch to the speed level "4".

(b2) If the current speed level is the slowest speed level, the speed judgment subunit 206 does not instruct the transmission management subunit 204 to change the speed level.

(7) Key Information Storage Subunit 207 and Content Storage Unit 208

The key information storage subunit 207 is a recording medium such as a RAM, and is a protected area at which a security level of a predetermined degree or more is preserved. The key information storage subunit 207 may be protected by, for example, a tamper-resistant means. The key information storage subunit 207 includes an area for storing therein the content key parameter and the encryption key.

The content storage unit 208 is a recording medium such as a hard disk. The content storage unit 208 stores therein one or more contents held by the content transmission device 101.

As described above, the content transmission device 101 can switch to a proper speed level according to the status of the content key confirmation processing, and therefore reduce the failure of the content key confirmation processing during special playback.

2.3 Operations of Content Transmission/Reception System 10

The following is a general description of the operations performed when the content transmission device 101 transmits, at the request of the content reception device 102, copyright-protected content to the content reception device 102 via the IP network 103.

The content reception device 102 transmits, to the content transmission device 101, a content list acquisition request which is a request for acquiring a content list including the titles etc. of a plurality of contents stored in the content transmission device 101. The content transmission device 101 generates a content list including the titles etc. of one or more contents stored in the content storage unit 208, and transmits the generated content list to the content reception device 102. A user of the content reception device 102 selects content from the content list.

Next, the content transmission device 101 and the content reception device 102 perform the authentication and key exchange processing between each other.

When the authentication and key exchange processing has succeeded, the content transmission device 101, in response to the content acquisition request made by the content reception device 102, encrypts and transmits the target content portion data indicated by the content acquisition request. Thereafter, the content reception device 102 receives the encrypted content portion data.

The content reception device 102 generates a content key based on (i) the encryption key received through the authentication and key exchange processing and (ii) the content key parameter appended to the encrypted content portion data, and then decrypts the encrypted content portion data using the generated content key.

At a timing specified in the DTCP-IP standards, the content transmission device 101 receives a content key confirmation request from the content reception device 102. The content key confirmation request contains the content key parameter used by the content reception device 102. The content transmission device 101 receives this content key parameter and confirms whether or not the received content key parameter is valid.

The content transmission device 101 also performs control for switching to a proper speed level depending on the status of the content key confirmation processing.

As described above, the content transmission device 101 encrypts and transmits copyright-protected content to the content reception device 102. During the above procedure, the content transmission device 101 switches to a proper speed level depending on the status of the content key confirmation processing. This way, the content transmission device 101 can reduce the failure of the content key confirmation processing during special playback.

Figure 5:
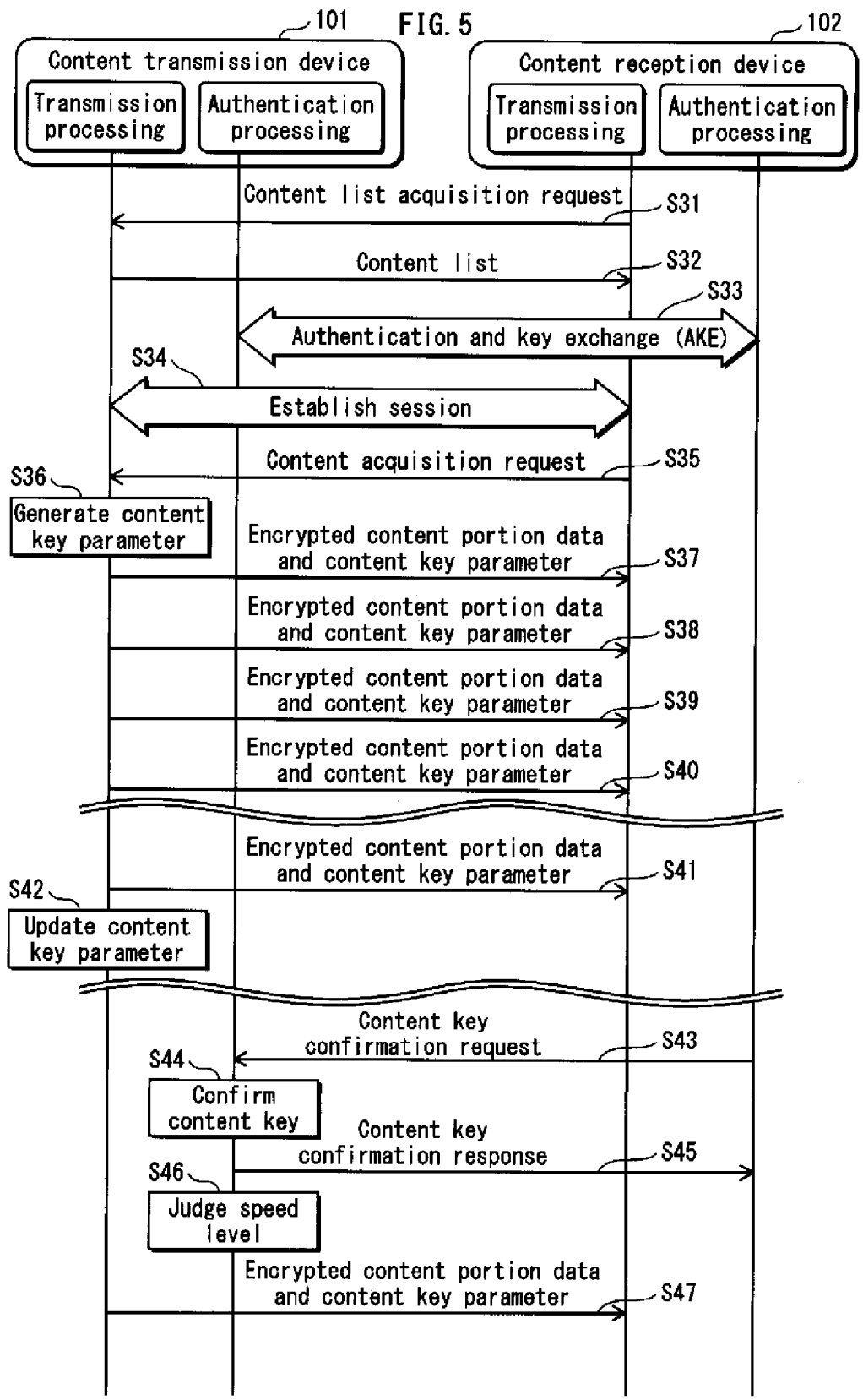
FIG. 5 shows one example of a processing sequence that occurs between the content transmission device 101 and a content reception device 102 during normal playback.

2.4 Operations of Content Transmission/Reception System 10 During Normal Playback With reference to the communication sequence diagram of FIG. 5, the following describes the communication sequence followed by the content transmission device 101 and the content reception device 102 in a case where the content reception device 102 performs normal playback of the received content.

Referring to FIG. 5, the transmission processing indicates communication involving the transmission management subunit 204, and the authentication processing indicates communication involving the authentication and key exchange unit 202 and the key information management subunit 203.

First, the transmission management subunit 204 in the content transmission device 101 receives a content list acquisition request (S31), and transmits a content list of the contents stored in the content transmission device 101 to the content reception device 102 (S32).

The content reception device 102 selects content to be played back and performs the authentication and key exchange (AKE) between itself and the content transmission device 101 (S33). In S33, the authentication and key exchange unit 202 in the content transmission device 101 generates an encryption key and transmits the encryption key, which is in an encrypted state, to the content reception device 102.

Next, a session is established between the content transmission device 101 and the content reception device 102 (S34). Thereafter, the transmission management subunit 204 in the content transmission device 101 receives a content acquisition request from the content reception device 102 (S35).

The transmission management subunit 204 requests the key information management subunit 203 to provide a content key parameter, and the key information management subunit 203 generates the content key parameter (S36). The transmission management subunit 204 encrypts content portion data to be transmitted, and transmits the encrypted content portion data to the content reception device 102 (S37, S38, . . . , S41). Note that the packets transmitted in S37, S38, . . . , S41 containing the encrypted content portion data also contain the content key parameter used to generate the content keys. Encrypted content portion data of a predetermined size is transmitted in one packet.

The key information management subunit 203 in the content transmission device 101 updates the content key parameter each time 128 MB of encrypted content portion data is transmitted (S42).

While receiving the encrypted content portion data, the content reception device 102 performs the content key confirmation processing at timings specified in the DTCP-IP standards. First, the content reception device 102 transmits, to the content transmission device 101, (i) the content key parameter appended to the encrypted content portion data that has been received and (ii) a content key confirmation request (S43). After receiving the content key confirmation request, the key information management subunit 203 in the content transmission device 101 references the content key parameter currently stored in the content transmission device 101 so as to confirm whether or not the content key is valid (S44). The key information management subunit 203 notifies the confirmation result to the content reception device 102 in the form of a content key confirmation response (S45). When the content key confirmation processing has succeeded, the key information management subunit 203 returns ACCEPTED in the content key confirmation response. When the content key confirmation processing has failed, the key information management subunit 203 returns REJECTED in the content key confirmation response.

The speed judgment subunit 206 in the content transmission device 101 makes a judgment on the speed level (S46). Here, as a result of the judgment on the speed level, the transmission management subunit 204 does not change the speed level, but instead maintains the current speed level and continues transmission of encrypted content portion data (S47).

Figure 6:
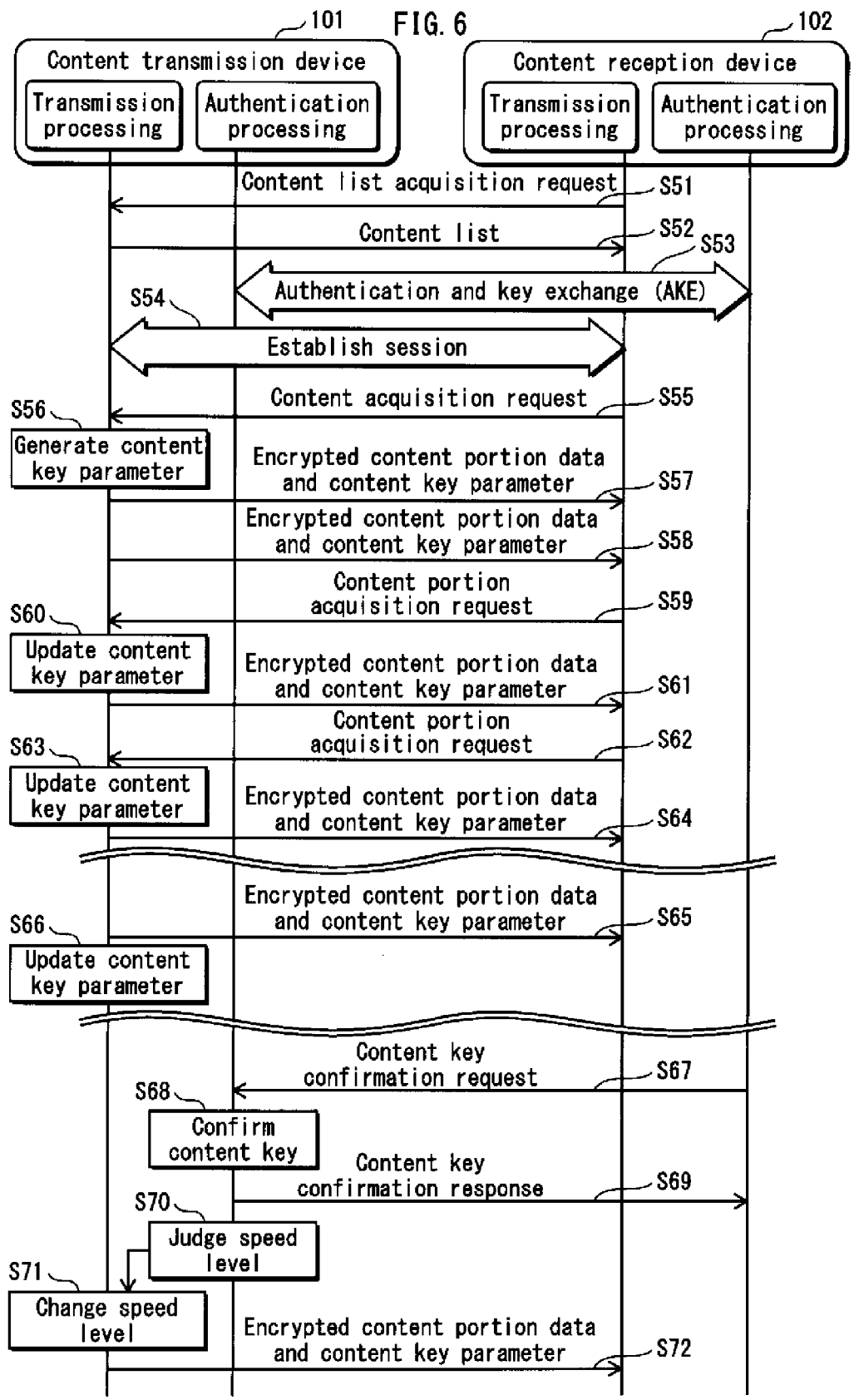
FIG. 6 shows one example of a processing sequence that occurs between the content transmission device 101 and the content reception device 102 during special playback.

2.5 Operations of Content Transmission/Reception System 10 During Special Playback With reference to the communication sequence diagram of FIG. 6, the following describes the communication sequence followed by the content transmission device 101 and the content reception device 102 in a case where the content reception device 102 performs special playback of the received content.

In general, content playback functions of the content reception device 102 include a normal playback function that denotes playback at a normal speed, and special playback functions that are referred to as fast-forwarding, fast-rewinding, and the like.

Each time the content transmission device 101 receives the content acquisition request or the content portion acquisition request from the content reception device 102 in a single session, the content transmission device 101 updates the content key parameter. When performing normal playback, the content reception device 102 transmits a single content acquisition request and acquires content data. When performing fast-forward playback, the content reception device 102 transmits content portion acquisition requests for corresponding portions of the content, and acquires content portion data of certain ranges of the content. Said corresponding portions of the content are obtained by skipping the other portions of the content. In other words, when performing fast-forward playback, the content reception device 102 transmits a content portion acquisition request to the content transmission device 101 a predetermined number of times or more within a certain period of time. This results in frequent updates of the content key parameter in the content transmission device 101.

In the communication sequence diagram of FIG. 6, the transmission processing indicates communication involving the transmission management subunit 204, and the authentication processing indicates communication involving the authentication and key exchange unit 202 and the key information management subunit 203.

First, the transmission management subunit 204 in the content transmission device 101 receives a content list acquisition request (S51), and transmits a content list of the contents stored in the content transmission device 101 to the content reception device 102 (S52).

The content reception device 102 selects content to be played back and performs the authentication and key exchange (AKE) between itself and the content transmission device 101 (S53). In S53, the authentication and key exchange unit 202 in the content transmission device 101 generates an encryption key and transmits the encryption key, which is in an encrypted state, to the content reception device 102.

Next, a session is established between the content transmission device 101 and the content reception device 102 (S54). Thereafter, the transmission management subunit 204 in the content transmission device 101 receives a content acquisition request (S55).

The transmission management subunit 204 requests the key information management subunit 203 to provide a content key parameter, and the key information management subunit 203 generates the content key parameter (S56). The transmission management subunit 204 encrypts content portion data to be transmitted, and transmits the encrypted content portion data to the content reception device 102 (S57 and S58). Note that the packets containing the encrypted content portion data also contain the content key parameter used to generate the content keys. Encrypted content portion data of a predetermined size is transmitted in one packet.

When a user operation or the like has switched to special playback such as fast-forwarding, the content reception device 102 transmits a content portion acquisition request to the content transmission device 101 (S59).

In the content transmission device 101, the transmission management subunit 204 receives the content portion acquisition request, and the key information management subunit 203 updates the content key parameter (S60). The transmission management subunit 204 regards the content portion data of a range specified by the content portion acquisition request as a transmission target, and transmits the encrypted content portion data to the content reception device 102 (S61). Note that each packet to be transmitted containing the encrypted content portion data also contains the content key parameter used to generate the content key, therefore transmitting the content key parameter updated in S60.

While the fast-forwarding is being continued in the content reception device 102, the transmission management subunit 204 in the content transmission device 101 receives a content portion acquisition request (S62), and the key information management subunit 203 in the content transmission device 101 updates the content key parameter (S63). The transmission management subunit 204 regards the content portion data of a range specified by the content portion acquisition request as a transmission target, and transmits the encrypted content portion data to the content reception device 102 (S64 and S65). Note that each packet to be transmitted containing the encrypted content portion data in S64 also contains the content key parameter updated in S63.

The key information management subunit 203 in the content transmission device 101 updates the content key parameter each time 128 MB of content data is transmitted (S66).

While receiving the encrypted content portion data, the content reception device 102 performs the content key confirmation processing at timings specified in the DTCP-IP standards. First, the content reception device 102 transmits, to the content transmission device 101, (i) the content key parameter appended to the encrypted content portion data that has been received and (ii) a content key confirmation request (S67). After receiving the content key confirmation request, the key information management subunit 203 in the content transmission device 101 references the content key parameter currently stored in the content transmission device 101 so as to confirm whether or not the content key is valid (S68). The key information management subunit 203 notifies the confirmation result to the content reception device 102 in the form of a content key confirmation response (S69). When the content key confirmation processing has succeeded, the key information management subunit 203 returns ACCEPTED in the content key confirmation response. When the content key confirmation processing has failed, the key information management subunit 203 returns REJECTED in the content key confirmation response.

The speed judgment subunit 206 in the content transmission device 101 makes a judgment on the speed level (S70). Here, as a result of the judgment on the speed level, the speed judgment subunit 206 switches to a slower speed level in order to reduce the frequency at which the content key parameter is updated (S71). The transmission management subunit 204 continues transmission of content data at said slower speed level (S72).

This concludes the description of the operations performed by the content transmission device 101 and the content reception device 102 when performing special playback, which is referred to as fast-forwarding, fast-rewinding, etc.

In the above explanation, for example, the content portion acquisition request is transmitted (S59), the content key parameter is updated (S60), and the encrypted content portion data and the content key parameter are transmitted (S61). Furthermore, the content portion acquisition request is transmitted (S62), the content key parameter is updated (S63), and the encrypted content portion data and the content key parameter are transmitted (S64). However, in reality, it is not necessarily the case that the operations performed between the content transmission device 101 and the content reception device 102 occur exactly as illustrated in the communication sequence diagram of FIG. 6.

This is because the content reception device 102, for example, does not transmit the content portion acquisition request (S62) after confirming that the encrypted content portion data and the content key parameter have been received (S61).

For example, the transmission of the content portion acquisition request (S59) and the transmission of the content portion acquisition request (S62) are performed in the order illustrated in FIG. 6. That is, the transmission of the content portion acquisition request in step S62 is performed after the transmission of the content portion acquisition request in step S59 has completed.

However, it is not necessarily the case that the update of the content key parameter (S60) and the transmission of the encrypted content portion data and the content key parameter (S61) are performed immediately after the transmission of the content portion acquisition request (S59).

For example, it is possible that immediately after the content portion acquisition request is transmitted (S59), the transmission of the content portion acquisition request (S62) precedes the update of the content key parameter (S60). Subsequently, it is possible that after step S62, the update of the content key parameter (S60) is performed, followed by the transmission of the encrypted content portion data and the content key parameter (S61).

When performing special playback, which is referred to as fast-forwarding, fast-rewinding, etc., it is possible that ten content portion acquisition requests are transmitted in succession from the content reception device 102 to the content transmission device 101. Thereafter, in concert with each of the ten content portion acquisition requests, the content transmission device 101 updates the content key parameter and transmits the encrypted content portion data and the content key parameter to the content reception device 102.

If such a situation occurs, the content key parameter stored in the content reception device 102 and the content key parameter stored in the content transmission device 101 may not match each other at a certain point.

In such a situation, the content transmission device 101 can change the speed level depending on the status of the content key confirmation processing as has been described above. During special playback, when a content portion acquisition request is made a predetermined number of times or more within a certain period of time, the transmission speed can be slowed down. This makes it possible to reduce the frequency at which the content key parameter is updated, and consequently to reduce the failure of the content key confirmation processing.

Also, by setting the transmission bit rate corresponding to the slowest speed level to, for example, a content bit rate of content that is currently being transmitted, the transmission speed can be controlled such that the video that is currently being played back is not interrupted.

2.6 Operations of Authentication and Key Exchange

Figure 7:
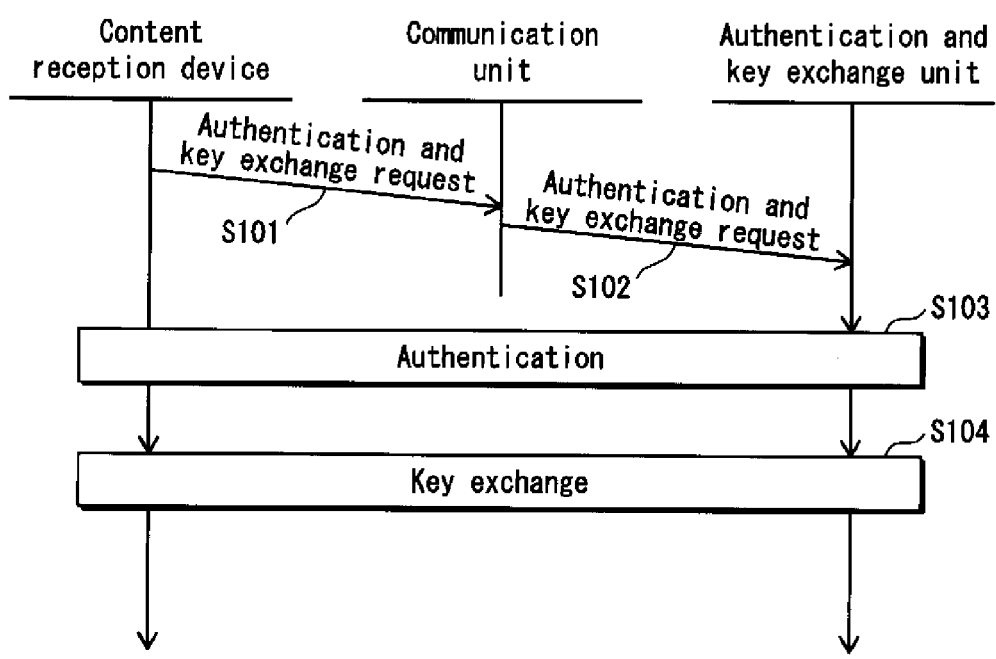
FIG. 7 shows one example of an authentication and key exchange sequence that occurs between the content transmission device 101 and the content reception device 102.

The following describes the operations of authentication and key exchange with use of the sequence diagram of FIG. 7.

The content reception device 102 transmits an authentication and key exchange request for requesting authentication and key exchange to the content transmission device 101 (step S101).

The authentication and key exchange unit 202 in the content transmission device 101 receives the authentication and key exchange request from the content reception device 102 via the communication unit 201 (step S102), and performs authentication (step S103) and key exchange (step S104) between the content transmission device 101 and the content reception device 102.

Figure 8:
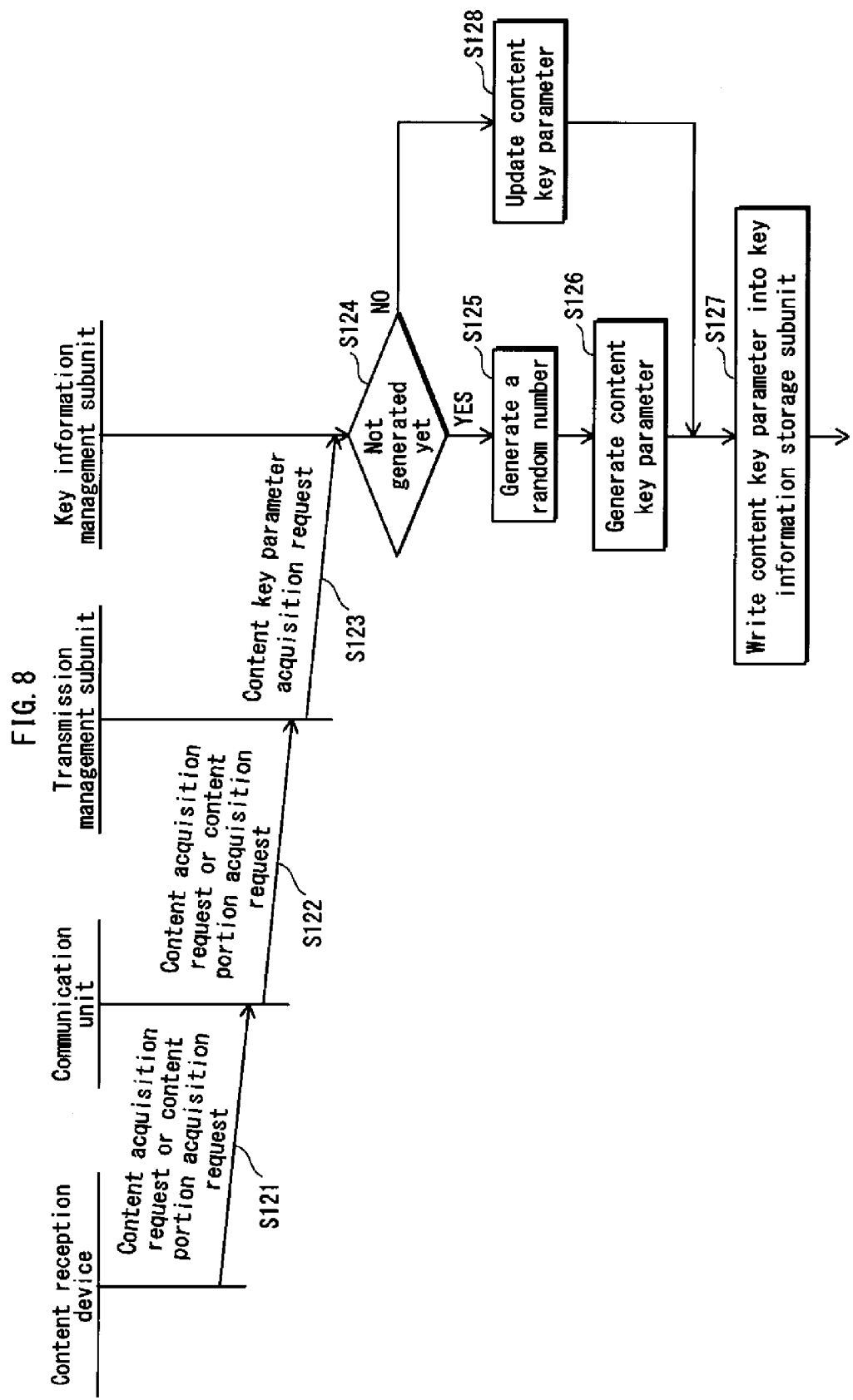
FIG. 8 shows one example of a sequence that occurs between the content transmission device 101 and the content reception device 102, the sequence ranging from transmission of a content acquisition request to transmission of an encrypted content portion.
Figure 9:
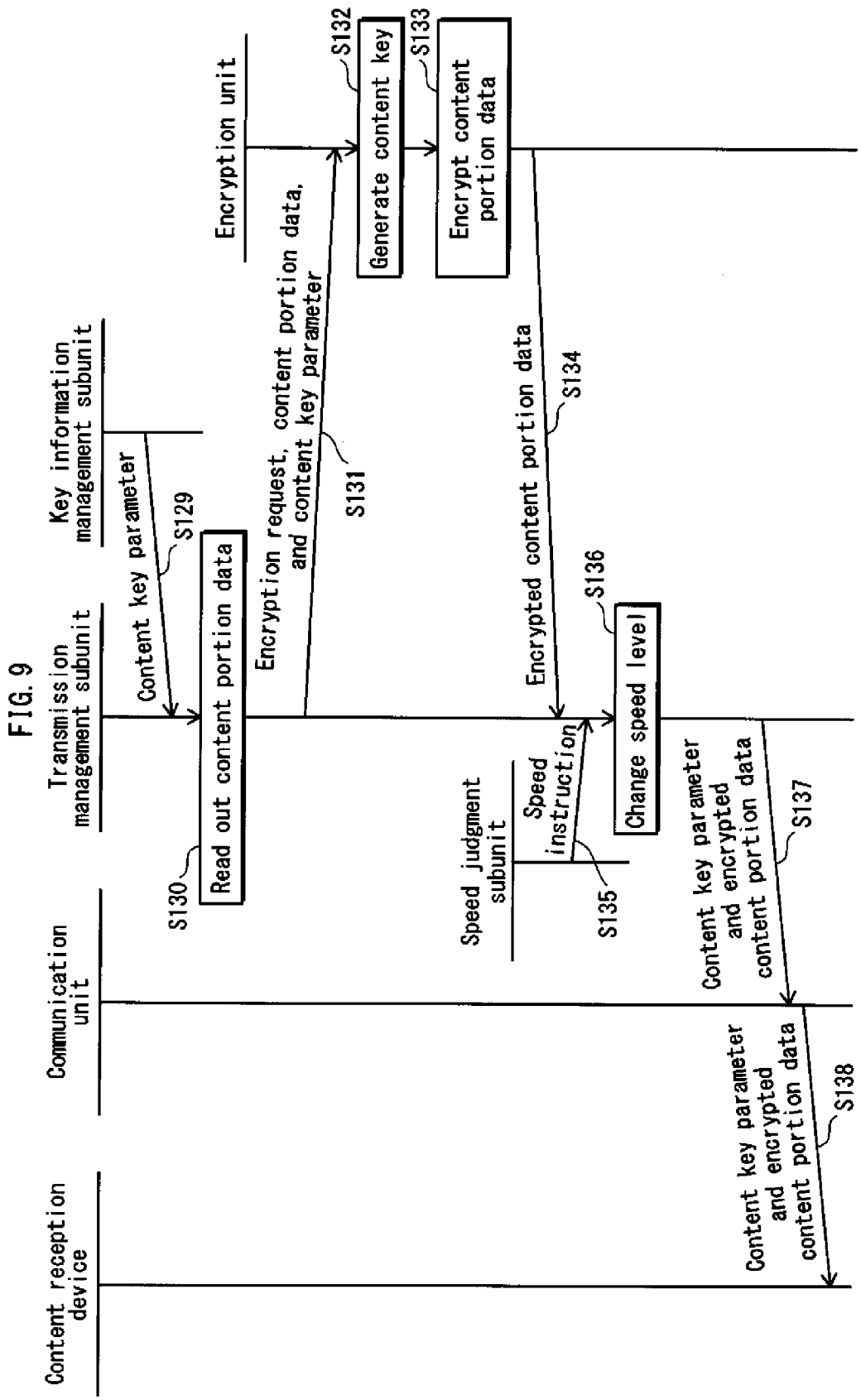
FIG. 9 shows one example of a sequence that occurs between the content transmission device 101 and the content reception device 102, the sequence ranging from transmission of a content acquisition request to transmission of an encrypted content portion.

2.7 Operations Ranging from Reception of Content Acquisition Request and Content Portion Acquisition Request to Transmission of Encrypted Content Portion Data With reference to the sequence diagrams of FIGS. 8 and 9, the following describes the operations performed by the content transmission device 101, ranging from reception of a content acquisition request and a content portion acquisition request to transmission of encrypted content portion data.

The content reception device 102 transmits a content acquisition request or a content portion acquisition request, which is then received by the communication unit 201 in the content transmission device 101 (step S121). The communication unit 201 outputs the content acquisition request or the content portion acquisition request to the transmission management subunit 204 (step S122).

The transmission management subunit 204 outputs an acquisition request for a content key parameter to the key information management subunit 203 (step S123).

When the content key parameter has not yet been generated (the "YES" branch of step S124), the key information management subunit 203 generates a random number (step S125) and regards the generated random number as the content key parameter (step S126).

When the content key parameter has already been generated (the "NO" branch of step S124), the key information management subunit 203 updates the content key parameter (step S128).

Next, the key information management subunit 203 writes the generated or updated content key parameter into the key information storage subunit 207 (step S127). The key information management subunit 203 also outputs the content key parameter to the transmission management subunit 204 (step S129).

The transmission management subunit 204 reads out content portion data, which is a portion of content data, from the content storage unit 208 (step S130), and outputs the read content portion data, the content key parameter, and an encryption request to the encryption unit 205 (step S131).

The encryption unit 205 generates a content key (step S132), encrypts the content portion data by using the content key as a key so as to generate encrypted content portion data (step S133), and outputs the generated encrypted content portion data to the transmission management subunit 204 (step S134).

The speed judgment subunit 206 outputs a speed instruction to the transmission management subunit 204, and the transmission management subunit 204 receives the speed instruction from the speed judgment subunit 206 (step S135). Next, the transmission management subunit 204 switches to a proper speed level based on the speed instruction received from the speed judgment subunit 206 (step S136).

Thereafter, the transmission management subunit 204 transmits, at said proper speed level, the content key parameter and the encrypted content portion data to the content reception device 102 via the communication unit 201 (steps S137 and S138).

2.8 Operations of Content Key Confirmation

Figure 10:
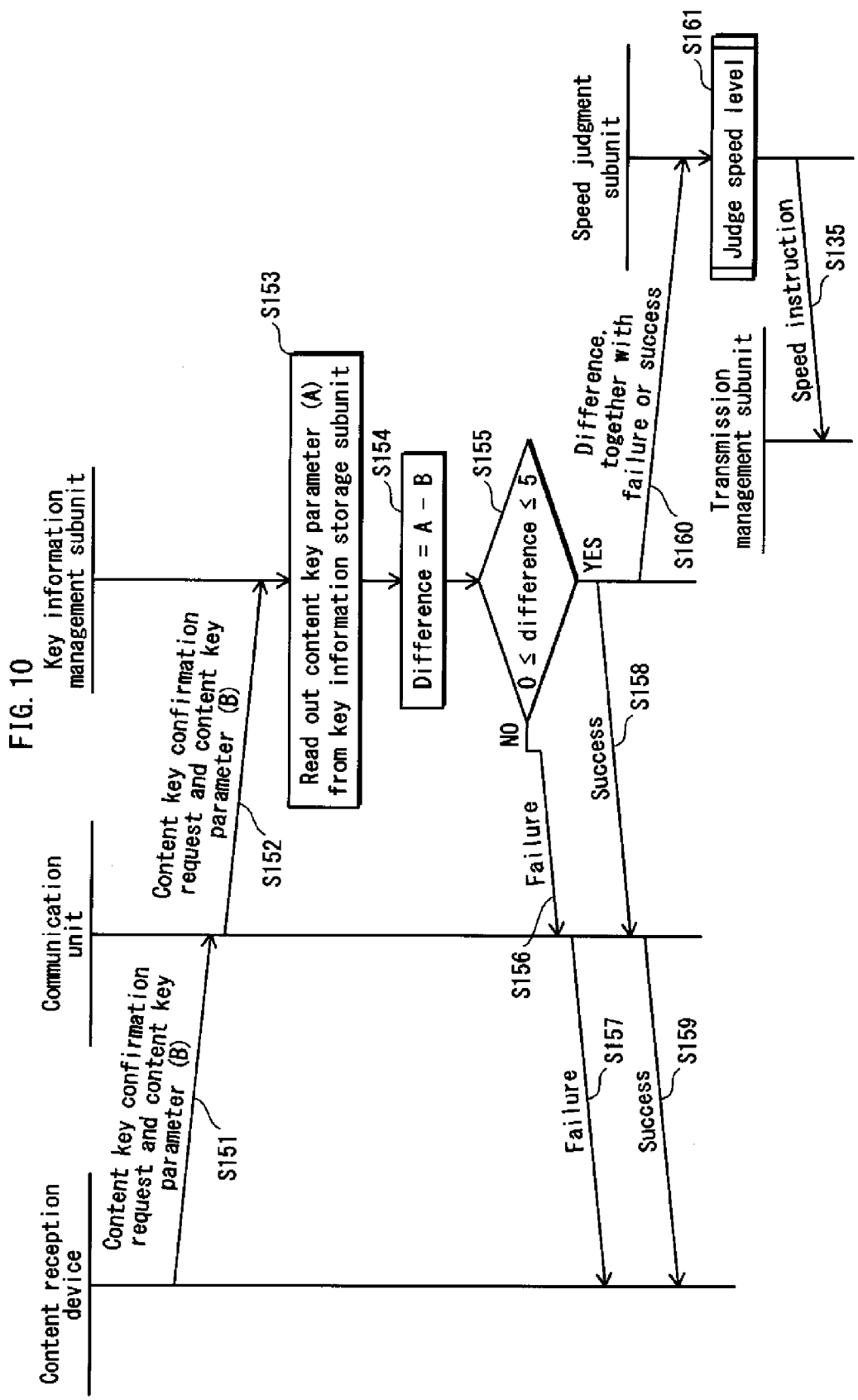
FIG. 10 shows one example of a sequence that occurs between the content transmission device 101 and the content reception device 102, the sequence ranging from transmission of a content key confirmation request to a judgment on a speed level.

With reference to the sequence diagram of FIG. 10, the following describes the operations of the content key confirmation performed in the content transmission/reception system 10.

The content reception device 102 transmits a content key parameter (referred to as a content key parameter B) and a content key confirmation request to the key information management subunit 203 via the communication unit 201 in the content transmission device 101 (steps S151 to S152).

Next, the key information management subunit 203 reads out a content key parameter (referred to as a content key parameter A) from the key information storage subunit 207 (step S153).

Then, the key information management subunit 203 calculates a difference between the content key parameters A and B using the following equation: difference=content key parameter A−content key parameter B (step S154). If the difference is smaller than "0" or is greater than or equal to "6" (the "NO" branch of step S155), then there is a possibility that the content key parameter B is not valid, and therefore the key information management subunit 203 notifies "Failure" as the content key confirmation response to the content reception device 102 via the communication unit 201 (steps S156 and S157).

If the difference is greater than or equal to "0" and is smaller than or equal to "5" (the "YES" branch of step S155), then the key information management subunit 203 determines that the content key parameter B is valid, and notifies "Success" as the content key confirmation response to the content reception device 102 via the communication unit 201 of the key information management subunit 203 (steps S158 and S159).

Thereafter, the key information management subunit 203 outputs the content key confirmation response and the difference to the speed judgment subunit 206, and the speed judgment subunit 206 receives the content key confirmation response and the difference (step S160).

Then, the speed judgment subunit 206 makes a judgment on the speed level by using the received content key confirmation response and difference (step S161), and outputs a speed instruction to the transmission management subunit 204 (step S135).

2.9 Control on Speed Level

Figure 11:
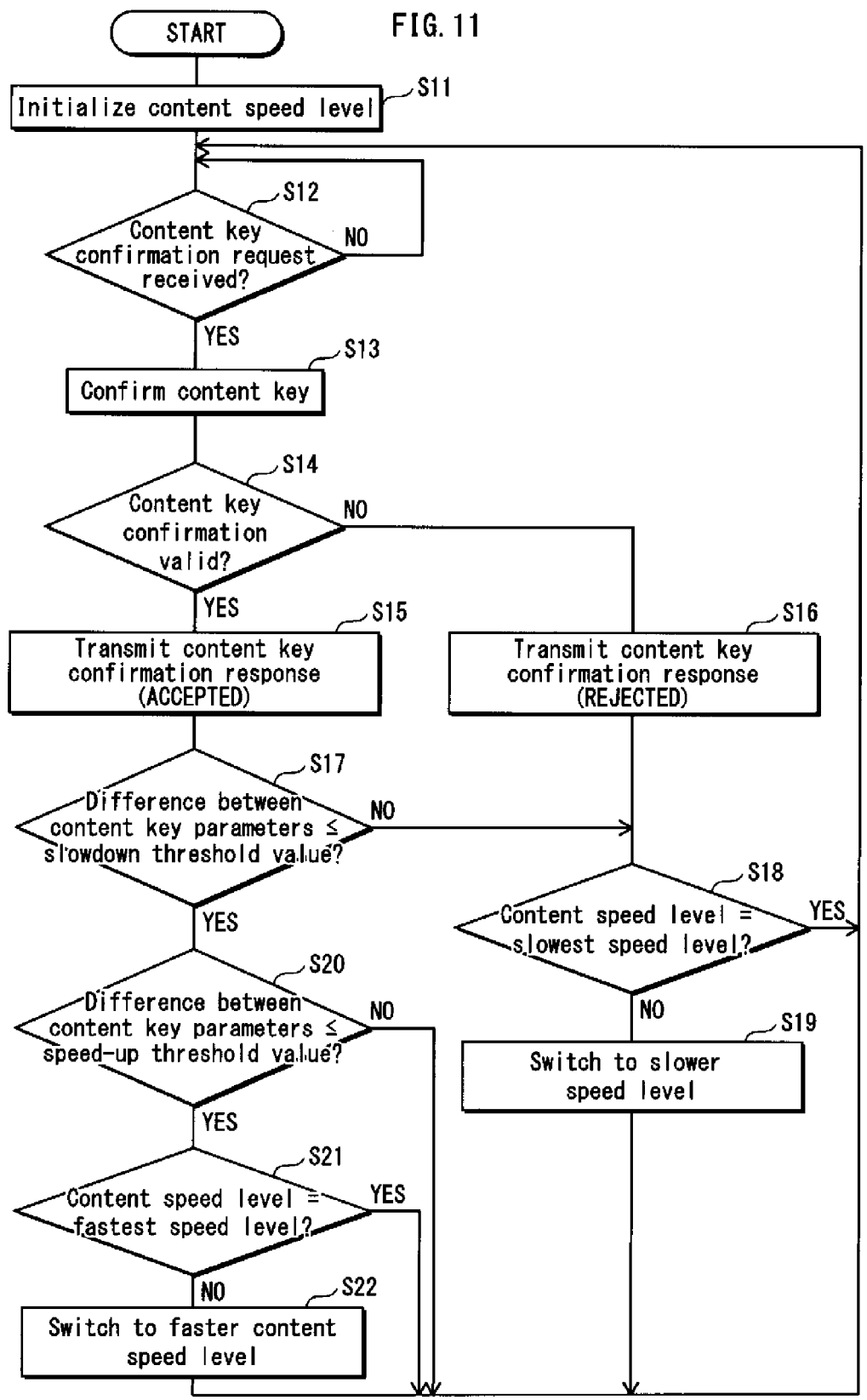
FIG. 11 is a flowchart showing the operations of the judgment on the speed level, which is made by the content transmission device 101.

With reference to the flowchart of FIG. 11, the following describes the operational procedure taken by the content transmission device 101 to control the speed level.

First, the content transmission device 101 establishes a session for transmitting content between itself and the content reception device 102. After the session has been established, the content transmission device 101 starts the processing.

In order to initialize the speed level, the transmission management subunit 204 sets the speed level to "3" (step S11).

The key information management subunit 203 waits for reception of a content key confirmation request from the content reception device 102 (step S12), and upon receiving the content key confirmation request, performs content key confirmation processing specified in the DTCP-IP standards (step S13). A content key parameter is appended to the content key confirmation request. The key information management subunit 203 reads out the content key parameter from the key information storage subunit 207, and judges whether a difference between the read content key parameter and the received content key parameter falls within a specified range.

The key information management subunit 203 judges that (i) the content key parameter is valid if the difference falls within the specified range, and (ii) the content key parameter may be invalid if the difference does not fall within the specified range (step S14).

If the content key confirmation is valid (the "YES" branch of step S14), the key information management subunit 203 notifies a content key confirmation response (ACCEPTED) to the content reception device 102 via the communication unit 201 (step S15). Next, the key information management subunit 203 notifies the difference to the speed judgment subunit 206, and the speed judgment subunit 206 judges whether the received difference is smaller than or equal to the slowdown threshold value (step S17).

When judging that the difference is not smaller than or equal to the slowdown threshold value (the "NO" branch of step S17), the speed judgment subunit 206 further judges whether the current speed level is the slowest speed level (step S18). Here, there are five speed levels, and the speed level "5" denotes the slowest speed. If the current speed level is not the slowest speed level (the "NO" branch of step S18), the speed judgment subunit 206 instructs the transmission management subunit 204 to switch to a slower speed level, and accordingly, the transmission management subunit 204 changes the speed level (step S19). Thereafter, the processing returns to step S12 and is repeated therefrom.

On the other hand, if the current speed level is the slowest speed level (the "YES" branch of step S18), the speed level is not changed. Thereafter, the processing returns to step S12 and is repeated therefrom.

This way, even when the content key confirmation is valid, if the difference is greater than or equal to a predetermined value, the frequency at which the content key parameter is updated can be reduced by slowing down the transmission speed.

When judging that the received difference is smaller than or equal to the slowdown threshold value (the "YES" branch of step S17), the speed judgment subunit 206 further judges whether the received difference is smaller than or equal to the speed-up threshold value (step S20). When judging that the received difference is smaller than or equal to the speed-up threshold value (the "YES" branch of step S20), the speed judgment subunit 206 further judges whether the current speed level is the fastest speed level (step S21). Here, the speed level "1" denotes the fastest speed. If the current speed level is not the fastest speed level (the "NO" branch of step S21), the speed judgment subunit 206 instructs the transmission management subunit 204 to switch to a faster speed level, and accordingly, the transmission management subunit 204 changes the speed level (step S22). Thereafter, the processing returns to step S12 and is repeated therefrom.

When judging that the received difference is not smaller than or equal to the speed-up threshold value (the "NO" branch of step S20), or if the current speed level is the fastest speed level (the "YES" branch of step S21), the speed level is not changed. Thereafter, the processing returns to step S12 and is repeated therefrom.

On the other hand, if the content key confirmation is not valid (the "NO" branch of step S14), the key information management subunit 203 notifies a content key confirmation response (REJECTED) to the content reception device 102 via the communication unit 201 (step S16). When the speed judgment subunit 206 has been notified by the key information management subunit 203, the speed judgment subunit 206 judges whether or not the current speed level is the slowest speed level (step S18). If the current speed level is not the slowest speed level (the "NO" branch of step S18), the speed judgment subunit 206 instructs the transmission management subunit 204 to switch to a slower speed level, and accordingly, the transmission management subunit 204 changes the speed level (step S19). Thereafter, the processing returns to step S12 and is repeated therefrom.

On the other hand, if the current speed level is the slowest speed level (the "YES" branch of step S18), the speed level is not changed. Thereafter, the processing returns to step S12 and is repeated therefrom.

2.10 Summary (1) As set forth above, the content transmission device 101 can switch to a proper speed level in accordance with the status of content key confirmation processing. Even when the content key confirmation is valid, if the difference is greater than or equal to a predetermined value, the content transmission device 101 can reduce the frequency at which the content key parameter is updated by slowing down the transmission speed. This makes it possible to reduce the failure of the content key confirmation processing.

It is preferable that the playback of content by the content reception device 102 be not interrupted halfway, even at the slowest speed level. A transmission bit rate corresponding to the slowest speed level is set to, for example, the content bit rate of content that is currently being transmitted.

Meanwhile, a transmission bit rate corresponding to the fastest speed level is set based on, for example, a limit value set for the encryption performance of the content transmission device 101.

If the difference between the content key parameters is smaller than or equal to the speed-up threshold value, the amount of content data to be transmitted can be increased by accelerating the transmission speed. This makes it possible to, for example, complete the processing of moving content to the content reception device (i.e., MOVE as specified in DTCP-IP) in a short period of time while conforming to the DTCP-IP standards.

(2) One aspect of the present invention is a content transmission device that encrypts and transmits content, the content transmission device comprising: an authentication and key exchange unit operable to perform authentication processing and transmit an encryption key; a transmission management unit operable to receive a content acquisition request and control transmission of content data to be transmitted based on the content acquisition request; an encryption unit operable to generate a content key based on a content key parameter and the encryption key, and encrypt the content data to be transmitted by using the content key; a key information management unit operable to generate the content key parameter, which is used by the encryption unit, and compare a received content key parameter and the generated content key parameter to perform content key confirmation processing; and an encryption control unit operable to, by using a difference between the two content key parameters obtained as a result of the comparison made by the key information management unit, judges whether or not to change a transmission speed at which the content data is to be transmitted, wherein the transmission management unit changes the transmission speed at which the content data is to be transmitted based on a result of the judgment made by the encryption control unit.

With the above structure, the content transmission device can perform proper operational control in accordance with the current status, and reduce the failure of content key confirmation processing during special playback.

When the difference obtained as a result of the comparison is greater than a first threshold value, the encryption control unit may slow down the transmission speed.

The encryption control unit may store therein a second threshold value that is smaller than the first threshold value, and when the difference obtained as a result of the comparison is smaller than or equal to the second threshold value, may accelerate the transmission speed.

Another aspect of the present invention is a content transmission method for encrypting and transmitting content, the content transmission method comprising the steps of: (i) performing authentication processing and transmitting an encryption key; (ii) receiving a content acquisition request and transmitting content data to be transmitted based on the content acquisition request; (iii) generating a content key based on a content key parameter and the encryption key, and encrypting the content data to be transmitted by using the content key; (iv) generating the content key parameter, which is used in step (iii), and comparing a received content key parameter and the generated content key parameter to perform content key confirmation processing; (v) by using a difference between the two content key parameters obtained as a result of the comparison made in step (iv), judging whether or not to change a transmission speed at which the content data is to be transmitted, and (vi) changing the transmission speed at which the content data is to be transmitted based on a result of the judgment made in step (v).

Yet another aspect of the present invention is a content transmission device that encrypts and transmits each of portions that constitute content to a content reception device, the content transmission device comprising: a transmission control unit operable to receive a first request for transmitting a portion of the content from the content reception device, and to transmit to the content reception device (i) an encrypted portion, which is generated in response to the first request, and (ii) a first key parameter, based on which a content key is generated, the content key being used for encrypting the portion; a key management unit operable to (i) upon receiving the first request, generate the first key parameter when the first key parameter has not yet been generated, and update the first key parameter when the first key parameter has already been generated, and (ii) store therein the generated or updated first key parameter; and an encryption unit operable to generate the content key based on the first key parameter, and to encrypt the portion corresponding to the first request by using the generated content key so as to generate the encrypted portion, wherein the key management unit receives a second key parameter and a second request for confirmation of the content key from the content reception device, calculates a difference between the first key parameter and the received second key parameter, judges whether or not the calculated difference falls within a predetermined range, and transmits a result of the judgment to the content reception device as a content key confirmation response, and the transmission control unit judges, by using the difference, whether or not to change a transmission speed at which the encrypted portion is to be transmitted, determines one of transmission speeds based on a result of the judgment on the transmission speed, and transmits the encrypted portion at the determined transmission speed.

When the difference is greater than a first threshold value, the transmission control unit may slow down the transmission speed.

When the difference is smaller than or equal to a second threshold value, which is smaller than the first threshold value, the transmission control unit may accelerate the transmission speed.

3. Other Modifications

The present invention has been described based on the above embodiments. However, it goes without saying that the present invention is not limited to the above embodiments. The following cases are also included in the present invention.

(1) In the above embodiments, a normal range for the difference between the content key parameters is between 0 and 5 inclusive. Alternatively, a normal range for such a difference may be, for example, between 0 and 10 inclusive. Alternatively, a normal range for such a difference may be, for example, between 0 and 15 inclusive. Alternatively, a normal range for such a difference may be, for example, between 0 and 20 inclusive.

(2) According to the above embodiments, the transmission control units 313 and 210 (i) judge, by using the difference between the content key parameters, whether or not to change the transmission speed at which the encrypted content portion is to be transmitted, (ii) select a transmission speed based on the judgment result, and (iii) transmit the encrypted content portion in accordance with the selected transmission speed.

Here, the transmission of the encrypted content portion in accordance with the selected transmission speed encompasses the following cases.

(a) To lengthen or shorten an interval at which packets are transmitted, where a packet is a unit of transmission of an encrypted content portion.

(b) To reduce or increase the size of an encrypted content portion contained in one packet, which is a unit of transmission of an encrypted content portion.

(c) To change the image quality of content data to high image quality, middle image quality, or low image quality.

(d) To combine any of the above (a) through (c).

In this manner the transmission control units 313 and 210 change the speed at which the encrypted content portion data is to be transmitted.

(3) The key information management subunit 203 updates the content key parameter by, for example, adding a value "1" to the content key parameter using a modulus "2^64".

However, the update of the content key parameter is not limited to this method. The content key parameter may be updated in any of the following manners instead.

$$\text{Content key parameter} = \text{Content key parameter} + 2 \bmod 2^{64}$$

In this case, a normal range for the difference between the content key parameters may be, for example, between 0 and 10 inclusive.

$$\text{Content key parameter} = \text{Content key parameter} + 3 \bmod 2^{64}$$

In this case, a normal range for the difference between the content key parameters may be, for example, between 0 and 15 inclusive.

$$\text{Content key parameter} = \text{Content key parameter} - 1 \bmod 2^{64}$$

In this case, a normal range for the difference between the content key parameters may be, for example, between 0 and 5 inclusive.

$$\text{Content key parameter} = \text{Content key parameter} - 2 \bmod 2^{64}$$

In this case, a normal range for the difference between the content key parameters may be, for example, between 0 and 10 inclusive.

Alternatively, the key information management subunit 203 may update the content key parameter, for example, by adding a value "1" to the content key parameter using a modulus "2^128", or by adding a value "1" to the content key parameter using a modulus "2^256".

(4) Supplemental Explanation on Special Playback

The special playback denotes high-speed special playback such as fast-forwarding and fast-rewinding. Fast-forwarding is, for example, high-speed special playback toward a direction of a playback time axis, where high-speed means a speed faster than the speed of normal playback (e.g., 2× speed, 4× speed and 8× speed). Fast-rewinding is, for example, high-speed special playback toward a direction opposite from the direction of the playback time axis, where high-speed means a speed faster than the speed of normal rewind playback (e.g., 2× speed, 4× speed and 8× speed).

In a case where normal playback of entire content data is performed from the beginning of the content data, all of a plurality of frame images that constitute the content are played back in a playback order of the frame images. At this time, the content reception device 102 transmits a content acquisition request that does not contain range information to the content transmission device 101 as described earlier.

In a case where fast-forward playback is performed at 2× speed, every other frame image of all the plurality of frame images constituting the content is played back in the playback order of the frame images. At this time, the content reception device 102 transmits a plurality of content acquisition requests each containing range information to the content transmission device 101 in succession, as described earlier. The range information contained in each of the plurality of content acquisition requests indicates the corresponding every other frame image.

A similar rule applies to a case where fast-forward playback is performed at 4× speed. In this case, given that the plurality of frame images constituting the content are divided into groups that each include four consecutive frame images, only one frame image is played back from each of the groups in the playback order of the frame images. At this time, the content reception device 102 transmits a plurality of content acquisition requests each containing range information to the content transmission device 101 in succession, as described earlier. The range information contained in each of the plurality of content acquisition requests indicates one of the four consecutive frame images in the corresponding group.

A similar rule applies to a case where fast-rewind playback is performed.

(5) In Embodiment 1 described above, the content transmission/reception system 300 may further include a display device. Here, the display device is connected to the content reception device 340.

The playback unit 316 in the content reception device 340 (i) receives a content portion, (ii) decompresses the received content portion to generate digital image data and digital audio data, and (iii) outputs the generated digital image data and digital audio data to the display device.

The display device receives the digital image data and the digital audio data, and outputs an image and audio based on the received digital image data and digital audio data.

Alternatively, the playback unit 316 may (i) receive a content portion, (ii) decompress the received partial content to generate digital image data and digital audio data, (iii) convert the generated digital image data and digital audio data into an analog image signal and an analog audio signal, respectively, and (iv) output the analog image signal and the analog audio signal to the display device. In this case, the display device receives the analog image signal and the analog audio signal, and outputs an image and audio based on the received analog image signal and analog audio signal.

(6) Specifically, each of the above-described devices is a computer system composed of a microprocessor, ROM, RAM, hard disk unit, display unit, keyboard, mouse, etc. Computer programs are stored on the RAM or the hard disk unit. Each device achieves its functions by the microprocessor operating according to the computer programs. In order to achieve predetermined functions, the computer programs are composed of a combination of multiple operation codes that indicate instructions for the computer.

(7) Part or all of the constituent elements constituting each of the above-described devices may be assembled as one system LSI (Large Scale Integration). A system LSI is an ultra-multifunctional LSI produced by integrating multiple components on one chip and, more specifically, is a computer system including a microprocessor, ROM, RAM, and the like. Computer programs are stored on the RAM. The system LSI achieves its functions by the microprocessor operating according to the computer programs.

(8) Part or all of the constituent elements constituting each of the above-described devices may be assembled as an IC card or a single module that is attachable to and detachable from each device. The IC card/module is a computer system that includes a microprocessor, ROM, RAM, etc. The IC card/module may include therein the above-mentioned ultra-multifunctional LSI. The IC card/module achieves its functions by the microprocessor operating according to computer programs. The IC card/module may be tamper resistant.

(9) The present invention may be the above-indicated methods. The present invention may be computer programs that achieve the methods by a computer, or may be a digital signal comprising the computer programs.

The present invention may also be a computer-readable recording medium having recorded thereon the above-mentioned computer programs or digital signal. Examples of such a recording medium include a flexible disk, hard disk, CD-ROM, MO, DVD, DVD-ROM, DVD-RAM, BD (Blu-ray Disc), and semiconductor memory. The present invention may also be the digital signal recorded on such a recording medium.

The present invention may also be the computer programs or digital signal to be transmitted via networks, of which telecommunications networks, wire/wireless communications networks, and the Internet are representative, or via data broadcasting.

The present invention may also be a computer system comprising a microprocessor and memory, the memory storing the computer programs, and the microprocessor operating in accordance with the computer programs.

Also, in the present invention, another independent computer system may implement the computer programs or digital signal after the computer programs or digital signal is transferred via being recorded on the recording medium. Also, in the present invention, another independent computer system may implement the computer programs or digital signal after the computer programs or digital signal is transferred via one of the above-mentioned networks, etc.

(10) The present invention may be any combination of the above embodiments and modifications.

INDUSTRIAL APPLICABILITY

A content transmission device of the present invention is useful as an AV device and an information processing device (e.g., a PC) that have a communications function through which content is encrypted and then transmitted. The content transmission device of the present invention can also be applied for use as an LSI or the like.

REFERENCE SIGNS LIST 101 content transmission device
102 content reception device 103 IP network
201 communication unit
202 authentication and key exchange unit
203 key information management subunit
204 transmission management subunit
205 encryption unit
206 speed judgment subunit
207 key information storage subunit
208 content storage unit
209 key management unit
210 transmission control unit
300 content transmission/reception system
310 content transmission device
311 encryption unit
312 key management unit
313 transmission control unit
314 reception control unit
315 decryption unit
316 playback unit
317 key management unit
320 content storage device
330 network
340 content reception device
350 display device

The invention claimed is:

1. A content transmission device that encrypts and transmits each of portions that constitute content to a content reception device, the content transmission device comprising:
   a transmission control unit operable to receive a request for transmitting a portion of the content from the content reception device, and to transmit to the content reception device (i) an encrypted portion, which is generated in response to the request, and (ii) a first key parameter, based on which a content key is generated, the content key being used for encrypting the portion;
   a key management unit operable to (i) upon receiving the request, generate the first key parameter when the first key parameter has not yet been generated, and update the first key parameter when the first key parameter has already been generated, and (ii) store therein the generated or updated first key parameter; and
   an encryption unit operable to generate the content key based on the first key parameter, and to encrypt the portion corresponding to the request by using the generated content key so as to generate the encrypted portion,
   wherein the key management unit receives a second key parameter from the content reception device, and calculates a difference between the first key parameter and the received second key parameter,
   wherein the transmission control unit judges, by using the difference, whether or not to change a transmission speed at which the encrypted portion is to be transmitted, selects one of a plurality of transmission speeds based on a result of the judgment, and transmits the encrypted portion at the selected transmission speed,
   wherein when the difference is greater than a first threshold value, the transmission control unit selects one of the transmission speeds that is slower than a current transmission speed,
   wherein when the difference is smaller than or equal to a second threshold, the transmission control unit selects one of the transmission speeds that is faster than the current transmission speed, and
   wherein the second threshold value is smaller than the first threshold value.

2. An integrated circuit provided in a content transmission device that encrypts and transmits each of portions that constitute content to a content reception device, the integrated circuit comprising:
   a transmission control unit operable to receive a request for transmitting a portion of the content from the content reception device, and to transmit to the content reception device (i) an encrypted portion, which is generated in response to the request, and (ii) a first key parameter, based on which a content key is generated, the content key being used for encrypting the portion;
   a key management unit operable to (i) upon receiving the request, generate the first key parameter when the first key parameter has not yet been generated, and update the first key parameter when the first key parameter has already been generated, and (ii) store therein the generated or updated first key parameter; and
   an encryption unit operable to generate the content key based on the first key parameter, and to encrypt the portion corresponding to the request by using the generated content key so as to generate the encrypted portion,
   wherein the key management unit receives a second key parameter from the content reception device, and calculates a difference between the first key parameter and the received second key parameter,
   wherein the transmission control unit judges, by using the difference, whether or not to change a transmission speed at which the encrypted portion is to be transmitted, selects one of a plurality of transmission speeds based on a result of the judgment, and transmits the encrypted portion at the selected transmission speed,
   wherein when the difference is greater than a first threshold value, the transmission control unit selects one of the transmission speeds that is slower than a current transmission speed,
   wherein when the difference is smaller than or equal to a second threshold, the transmission control unit selects one of the transmission speeds that is faster than the current transmission speed, and
   wherein the second threshold value is smaller than the first threshold value.

3. A content transmission method used by a content transmission device that encrypts and transmits each of portions that constitute content to a content reception device, the content transmission method comprising the steps of:
   (a) receiving a request for transmitting a portion of the content from the content reception device, and transmitting to the content reception device (i) an encrypted portion, which is generated in response to the request, and (ii) a first key parameter, based on which a content key is generated, the content key being used for encrypting the portion;
   (b) upon receiving the request, (i) generating the first key parameter when the first key parameter has not yet been generated, and updating the first key parameter when the first key parameter has already been generated, and (ii) storing therein the generated or updated first key parameter; and
   (c) generating the content key based on the first key parameter, and encrypting the portion corresponding to the request by using the generated content key so as to generate the encrypted portion,
   wherein in step (b), a second key parameter is received from the content reception device, and a difference between the first key parameter and the received second key parameter is calculated, wherein in step (a), whether or not to change a transmission speed at which the encrypted portion is to be transmitted is judged by using the difference, one of a plurality of transmission speeds is selected based on a result of the judgment, and the encrypted portion is transmitted at the selected transmission speed, wherein in step (a), when the difference is greater than a first threshold value, one of the transmission speeds that is slower than a current transmission speed is selected, wherein in step (a), when the difference is smaller than or equal to a second threshold, one of the transmission speeds that is faster than the current transmission speed is selected, and wherein the second threshold value is smaller than the first threshold value.

* * * * *